United States Patent
Peyton et al.

(10) Patent No.: US 10,968,369 B2
(45) Date of Patent: Apr. 6, 2021

(54) CROSSLINKABLE POLYMER COMPOSITION

(71) Applicant: The University of Massachusetts, Boston, MA (US)

(72) Inventors: Shelly Peyton, Amherst, MA (US); John Klier, Leverett, MA (US); Yen Tran, Amherst, MA (US); Todd Emrick, South Deerfield, MA (US)

(73) Assignee: THE UNIVERSITY OF MASSACHUSETTS, Boston, MA (US)

( * ) Notice: Subject to any disclaimer, the term of this patent is extended or adjusted under 35 U.S.C. 154(b) by 323 days.

(21) Appl. No.: 16/045,904

(22) Filed: Jul. 26, 2018

(65) Prior Publication Data
US 2019/0031925 A1    Jan. 31, 2019

Related U.S. Application Data

(60) Provisional application No. 62/537,130, filed on Jul. 26, 2017.

(51) Int. Cl.
*C08F 220/28* (2006.01)
*C09J 7/38* (2018.01)
(Continued)

(52) U.S. Cl.
CPC ............. *C09J 7/385* (2018.01); *C08F 220/20* (2013.01); *C08F 220/28* (2013.01);
(Continued)

(58) Field of Classification Search
CPC ....... C09J 7/385; C08F 220/20; C08F 220/38; C08F 220/382
See application file for complete search history.

(56) References Cited

U.S. PATENT DOCUMENTS 5,308,887 A    5/1994 Ko et al.
5,721,329 A *  2/1998 Fujiwa ................... C07C 69/72
                                                         526/316
(Continued)

OTHER PUBLICATIONS

And Tang et al. Polym. Chem., 2015, 6, 6936-6945 (Year: 2015).*

(Continued)

*Primary Examiner* — Mark S Kaucher
(74) *Attorney, Agent, or Firm* — Cantor Colburn LLP

(57) ABSTRACT

A crosslinkable polymer composition includes repeating units of formula (I)

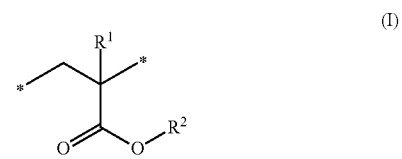

and repeating units derived from a monomer having an ethylenically unsaturated group and a crosslinkable functional group, wherein the crosslinkable functional group is capable of forming a covalent linkage with a crosslinkable functional group of an adjacent repeating unit. $R^1$ and $R^2$ are as defined herein. The crosslinkable polymer composition can be particularly useful, for example, for pressure sensitive adhesive or coating compositions. A method of making the polymer composition and a pressure sensitive adhesive and a coating are also described.

14 Claims, 11 Drawing Sheets

HEMA-LA

HEA

PEGDMA

PEGA

(51) Int. Cl.
C08F 220/38 (2006.01)
C08F 220/34 (2006.01)
C08F 220/20 (2006.01)

(52) U.S. Cl.
CPC .......... C08F 220/34 (2013.01); C08F 220/38 (2013.01); *C08F 220/281* (2020.02); *C08F 220/286* (2020.02); *C08F 220/382* (2020.02); *C08F 2800/10* (2013.01); *C08F 2810/20* (2013.01); *C08F 2810/50* (2013.01); *C09J 2301/414* (2020.08); *C09J 2433/00* (2013.01)

(56) References Cited

U.S. PATENT DOCUMENTS

| | | | | |
|---|---|---|---|---|
| 2003/0216519 | A1* | 11/2003 | Heilmann | C09D 201/08 525/191 |
| 2010/0120931 | A1* | 5/2010 | Zajaczkowski | C09J 133/14 521/134 |
| 2010/0209631 | A1* | 8/2010 | Kim | C09J 133/14 428/1.54 |
| 2017/0014776 | A1* | 1/2017 | Li | B01D 65/08 |

OTHER PUBLICATIONS

Guillaume Miquelard-Garnier, et al.,"Strain induced clustering in polyelectrolyte hydrogels", Soft Matter, 2008, 4; pp. 1011-1023.
Arevalo, Richard C. et al.; "Stress Heterogeneities in Sheared Type-I Collagen Networks Revealed by Boundary Stress Microscopy"; Plos One, vol. 1, Mar. 3, 2015, p. 1-12.
Caliari, Steven R. et al.; "Stiffening hydrogels for investigating the dynamics of hepatic stellate cell mechanotransduction during myofibroblast activation"; Scientific Reports, 6:21387; Feb. 2016; p. 1-10.
Caruso, Mary M. et al.; "Mechanically-Induced Chemical Changes in Polymeric Materials"; Chemical Reviews, vol. 109, 2009, p. 5755-5798.
Cui, Yulin et al.; "Strain Hardening and Highly Resilient Hydrogels Crosslinked by Chain-Extended Reactive Pseudo-Polyrotaxane"; The Royal Society of Chemistry, V. 00, 2013, p. 1-8.
Erk, Kendra A. et al.; "Strain Stiffening in Synthetic and Biopolymer Networks"; Biomacromolecules, vol. 11, 2010, p. 1358-1363.
Gardel, M. L. et al.; "Elastic Behavior of Cross-Linked and Bundled Actin Networks"; Science, vol. 304, May 28, 2004, p. 1301-1305.
Gardel, M. L. et al.; "Stress-Dependent Elasticity of Composite Actin Networks as a Model for Cell Behavior"; Physical Review Letters, vol. 96:088102, Mar. 3, 2006, p. 1-4.
Herrick, William G. et al.; "PEG-Phosphorylcholine Hydrogels as Tunable and Versatile Platforms for Mechanobiology"; Biomacromolecules, vol. 14, 2013, p. 2294-2304.
Janmey, Paul A. et al.; "Fibrin gels and their clinical and bioengineering applications"; J. R. Soc. Interface, vol. 6, 2009, p. 1-10.
Kouwer, Paul H. J. et al.; "Responsive biomimetic networks from polyisocyanopeptide hydrogels"; Nature, vol. 493; Jan. 31, 2013; p. 651-655.
Mabry, Kelly M. et al.; "Dynamic stiffening of poly(ethylene glycol)-based hydrogels to direct valvular interstitial cell phenotype in a three-dimensional environment"; Biomaterials, vol. 49, 2015, p. 47-56.
Middleton, L. Robert et al.; "Hierarchical Acrylic Acid Aggregate Morphologies Produce Strain-Hardening in Precise Polyethylene-Based Copolymers"; Macromolecules, vol. 48, 2015, p. 3713-3724.
Motte, Stephanie et al.; "Strain Stiffening in Collagen"; Biopolymers vol. 99:1, 2012, p. 35-46.
Myung, David et al.; "Biomimetic strain hardening in interpenetrating polymer network hydrogels"; Polymer, vol. 48, 2007, p. 5376-5387.
Rosales, Adrianne M. et al.; "Photoresponsive Elastic Properties of Azobenzene-Containing Poly(ethylene-glycol)-Based Hydrogels"; Biomacromolecules, vol. 16: 2015, p. 798-806.
Schmoller, K.M. et al.; "Cyclic hardening in bundled actin networks"; Nature Communications, vol. 1:134, 2010, p. 1-7.
Shih, Han et al.; "Tuning stiffness of cell-laden hydrogel via host-guest interactions"; Journal of Materials Chemistry B, vol. 00, 2012, p. 1-6.
Vader, David et al.; "Strain-Induced Alignment in Collagen Gels"; Plos One, vol. 4:6, Jun. 2009, p. 1-12.
Zheng, Jukuan et al.; "Strain-Promoted Cross-Linking of PEG-Based Hydrogels via Copper-Free Cycloaddition"; ACS MacroLetters, vol. 1, 2012, p. 1071-1073.

* cited by examiner

CROSSLINKABLE POLYMER COMPOSITION

STATEMENT REGARDING FEDERALLY SPONSORED RESEARCH & DEVELOPMENT

This invention was made with government support under DMR-1454806 awarded by the National Science Foundation. The government has certain rights in the invention.

BACKGROUND

Polymer gels are swellable, insoluble networks used in a broad array of applications, from tissue engineering to consumer products. A key feature of gels is their mechanical tunability, wherein the elastic moduli can range from tens of Pa to tens of MPa. The moduli of gels are highly controllable through alteration of backbone composition and crosslinking density. See, e.g., Herrick, W. G. et al. PEG-phosphorylcholine hydrogels as tunable and versatile platforms for mechanobiology. Biomacromolecules 14, 2294-2304 (2013). Two major limitations in this field are that, once synthesized, the modulus of a gel network is fixed, and gels are typically strain-weakening. This latter feature limits their utility in industrial applications that require robust strength during processing.

In contrast, nature's polymers exhibit strain-stiffening mechanisms. See, e.g., Arevalo R C, Kumar P, Urbach J S, Blair D L (2015) Stress Heterogeneities in Sheared Type-I Collagen Networks Revealed by Boundary Stress Microscopy. PLoS ONE 10(3): e0118021 (2015); Schmoller, K. M., Fernandez, P., Arevalo, R. C., Blair, D. L. & Bausch, A. R. Cyclic hardening in bundled actin networks. Nat. Commun. 1, 134 (2010); Vader, D., Kabla, A., Weitz, D. & Mahadevan, L. Strain-induced alignment in collagen gels. PLoS ONE 4, e5902 (2009); Motte, S. & Kaufman, L. J. Strain stiffening in collagen I networks. Biopolymers 99, 35-46 (2013); Janmey, P. A., Winer, J. P. & Weisel, J. W. Fibrin gels and their clinical and bioengineering applications. J. R. Soc. Interface 6, 1-10 (2009). Fibrin during blood clotting and actin cytoskeletal filaments during cell movement show rapid stiffening under deformation. See, e.g., Janmey, P. A., Winer, J. P. & Weisel, J. W. Fibrin gels and their clinical and bioengineering applications. J. R. Soc. Interface 6, 1-10 (2009); Gardel, M. L. et al. Elastic behavior of cross-linked and bundled actin networks. Science 304, 1301-1305 (2004); Gardel, M. L. et al. Stress-dependent elasticity of composite actin networks as a model for cell behavior. Phys. Rev. Lett. 96, 088102 (2006). These biological polymers inspire the creation of strain-responsive synthetic materials. Strain-induced strengthening has been widely exploited to improve the performance of several traditional polymer classes. For example, thermoplastics for applications like films, fibers, and foams are tunable via force-induced molecular orientation and crystallization/physical crosslinking. See, e.g., Caruso, M. M. et al. Mechanically-induced chemical changes in polymeric materials. Chem. Rev. 109, 5755-5798 (2009); Tosaka, M., Kohjiya, S., Ikeda, Y., Toki, S. & Hsiao, B. S. Molecular orientation and stress relaxation during strain-induced crystallization of vulcanized natural rubber. Polym. J. 42, 474-481 (2010). A similar mechanical tuning of crosslinked polymer materials including linear polymer gel precursors could greatly broaden their potential and utility.

Recent innovations have created dynamically responsive gels with increasing moduli induced via heat or light, but these typically require sophisticated chemistries, and would not work for materials in dark environments, such as adhesives. See, e.g., Caliari, S. R. et al. Stiffening hydrogels for investigating the dynamics of hepatic stellate cell mechanotransduction during myofibroblast activation. Sci. Rep. 6, 21387 (2016); Mabry, K. M., Lawrence, R. L. & Anseth, K. S. Dynamic stiffening of poly(ethylene glycol)-based hydrogels to direct valvular interstitial cell phenotype in a three-dimensional environment. Biomaterials 49, 47-56 (2015); Rosales, A. M., Mabry, K. M., Nehls, E. M. & Anseth, K. S. Photoresponsive elastic properties of azobenzene-containing poly(ethylene-glycol)-based hydrogels. Biomacromolecules 16, 798-806 (2015); Shih, H. & Lin, C. C. Tuning stiffness of cell-laden hydrogel via host-guest interactions. J. Mater. Chem. B 4, 4969-4974 (2016); Stowers, R. S., Allen, S. C. & Suggs, L. J. Dynamic phototuning of 3D hydrogel stiffness. Proc. Natl. Acad. Sci. U.S.A. 112, 1953-1958 (2015); Kouwer, P. H. J. et al. Responsive biomimetic networks from polyisocyanopeptide hydrogels. Nature 493, 651-655 (2013); Jaspers, M. et al. Ultra-responsive soft matter from strain-stiffening hydrogels. Nat. Commun. 5, 5808 (2014). Attempts to selectively tailor the strength and functionality of synthetic gel polymer networks by exploiting mechanical deformation have resulted in transient gel stiffening due to chain associations or elasticity, but not permanent strain-induced modulus or crosslinking increases across the range of deformations. See, e.g., Jaspers, M. et al. Ultra-responsive soft matter from strain-stiffening hydrogels. Nat. Commun. 5, 5808 (2014); Cui, Y., Tan, M., Zhu, A. & Guo, M. Strain hardening and highly resilient hydrogels crosslinked by chain-extended reactive pseudo-polyrotaxane. RSC Adv. 4, 56791-56797 (2014); Middleton, L. R. et al. Hierarchical acrylic acid aggregate morphologies produce strain-hardening in precise polyethylene-based copolymers. Macromolecules 48, 3713-3724 (2015); Myung, D. et al. Biomimetic strain hardening in interpenetrating polymer network hydrogels. Polymer 48, 5376-5387 (2007); Miquelard-Garnier, G., Creton, C. & Hourdet, D. Strain induced clustering in polyelectrolyte hydrogels. Soft Matter 4, 1011-1023 (2008); Zheng, J. et al. Strain-promoted crosslinking of PEG-based hydrogels via copper-free cycloaddition. ACS Macro Lett 1, 1071-1073 (2012); Erk, K. A., Henderson, K. J. & Shull, K. R. Strain stiffening in synthetic and biopolymer networks. Biomacromolecules 11, 1358-1363 (2010). Subsequent gel deformation in these systems typically produced similar or lower stiffness than the initial deformation, suggesting that the bonds are meta-stable, as opposed to the physical or chemical crosslinks.

Accordingly, there remains a need in the art for a new class of materials containing latent crosslinking domains to promote on-demand, strain induced hardening while using simple, scalable chemistry. Such a strain-induced crosslinking activation would be particularly useful in adhesive applications, coatings, elastomers, structural components, and the like, specifically, pressure sensitive adhesive applications.

BRIEF SUMMARY

One embodiment is a crosslinkable polymer composition comprising repeating units of formula (I)

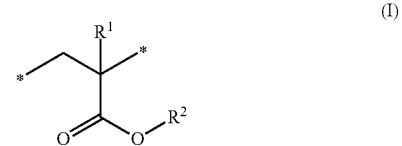

and repeating units derived from a monomer comprising an ethylenically unsaturated group and a crosslinkable functional group, wherein the crosslinkable functional group is capable of forming a covalent linkage with a second crosslinkable functional group of an adjacent repeating unit, a crosslinker, or both, when pressure is applied to the crosslinkable polymer composition, a time sufficient to cure the crosslinkable polymer composition has passed, or both; wherein in formula (I), $R^1$ is independently at each occurrence hydrogen or methyl; and $R^2$ is a $C_{4-12}$ alkyl group or a group of the formula

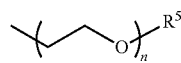

wherein $R^5$ is hydrogen or methyl and n is an integer from 1 to 230.

Another embodiment is a method for the manufacture of a crosslinkable polymer composition, the method comprising: copolymerizing a first monomer of formula (VII) and a second monomer of formula (VIII)

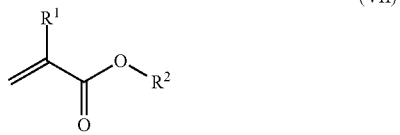
(VII)

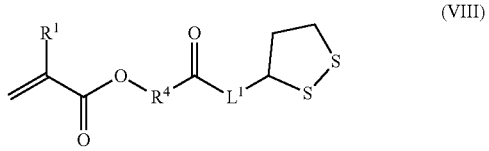
(VIII)

wherein $R^1$ and $R^3$ are independently at each occurrence hydrogen or methyl; $R^2$ is a $C_{4-12}$ alkyl group or a group of the formula

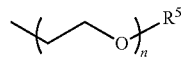

wherein $R^5$ is hydrogen or methyl and n is an integer from 1 to 230; $R^4$ is a $C_{1-14}$ alkylene group or a group of the formula

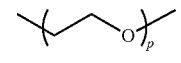

wherein p is an integer from 1 to 230; and $L^1$ is a $C_{1-12}$ alkylene group to provide a disulfide-containing polymer; and reducing the disulfide-containing polymer to provide the crosslinkable polymer composition.

Another embodiment is a pressure sensitive adhesive comprising a crosslinked polymer composition derived from the crosslinkable polymer composition.

Another embodiment is a method of making a pressure sensitive adhesive, the method comprising: contacting a substrate with the crosslinkable polymer composition; and curing the crosslinkable polymer composition to provide the pressure sensitive adhesive.

These and other embodiments are described in detail below.

BRIEF DESCRIPTION OF THE DRAWINGS

The following Figures refer to various exemplary embodiments.

DETAILED DESCRIPTION

Figure 1:
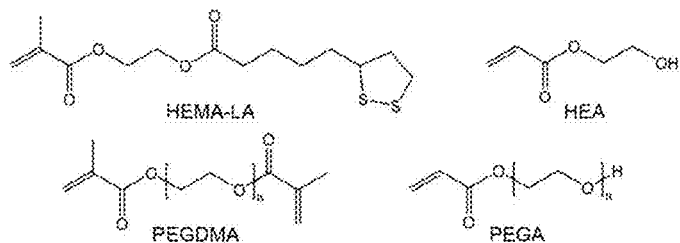
FIG. 1 shows monomer and crosslinker chemical structures.

The present inventors have discovered new crosslinkable polymer compositions containing latent crosslinking domains within a polymer backbone. For example, latent crosslinking domains based on a thiol-containing monomer or an acetoacetate-containing monomer and an amine-containing monomer have been demonstrated. Advantageously, such materials employ latent crosslinking to promote on-demand, strain-induced hardening while using simple, scalable polymer chemistry. For many applications, strain-induced crosslinking activation could provide a new type of latency, delaying crosslinking until mechanical activation occurs. Thus, the compositions and methods described herein offer opportunities to greatly simplify fabrication of pressure sensitive adhesives.

Accordingly, one aspect of the present disclosure is a crosslinkable polymer composition. The crosslinkable polymer composition can be particularly useful for pressure sensitive adhesive formulations. The crosslinkable polymer composition comprises a first polymer comprising repeating units of formula (I)

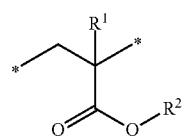

(I)

wherein $R^1$ is independently at each occurrence hydrogen or methyl, and $R^2$ is a $C_{4-12}$ alkyl group or a group of the formula

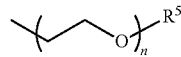

wherein $R^5$ is hydrogen or methyl and n is an integer from 1 to 230. The first polymer of the crosslinkable polymer composition further comprises repeating units derived from a monomer comprising an ethylenically unsaturated group and a crosslinkable functional group, wherein the crosslinkable functional group is capable of forming a covalent linkage with a second crosslinkable functional group of an adjacent repeating unit, a crosslinker, or both, when pressure is applied to the crosslinkable polymer composition, a time sufficient to cure the crosslinkable polymer composition has passed, or both. The ethylenically unsaturated group can be an acrylate group, a methacrylate group, an acrylamide group, a methacrylamide group, and the like. The crosslinkable functional group can include, for example, a thiol group, an aziridine group, a carboxylate group, an amine group, an acetoacetoxy group, an isocyanate group, an aldehyde group, a hydrazide group, a diacetone group, an alkoxysilane group, a ureido group, a carbamate group, an acetal group, a quinone group, or a combination comprising at least one of the foregoing. The particular functional group selected can depend on the type of crosslinking chemistry desired and the identity of any second crosslinkable functional groups needed to achieve crosslinking can be selected using the guidelines provided herein. For example, complementary crosslinkable functional groups which can be included in the repeating units in the polymer composition and/or any added crosslinker (if needed) can include, but are not limited to, aziridine and carboxylate groups, acetoacetoxy and amine, isocyanate, carboxylic acid, or aldehyde groups, diacetone acrylamide and hydrazide groups, ureido and aldehyde groups, carbamate and aldehyde groups, and quinone and amine groups. In some embodiments, crosslinking can be initiated by presence of water, oxygen, or a change in pH. In some embodiments, the crosslinkable functional group can be selected such that crosslinking of the crosslinkable polymer composition can occur via self-reaction or self-condensation, for example thiol-thiol interactions to form disulfides, self-condensation of acetal groups, and self-condensation of alkoxysilane groups. Preferably, the functional group is one which can undergo spontaneous crosslinking over time, or crosslinking under an applied strain, or both. Preferably, no thermal, UV, or other similar treatment is necessary to initiate crosslinking (i.e., crosslinking of the composition can be achieved under ambient conditions). In some embodiments, the functional groups can be initially in a protected or hidden form, which can advantageously allow the polymer to be relatively stable, with no crosslinking occurring until a desired time. In these embodiments, the functional groups can be deprotected prior initiating crosslinking (e.g., applying an external strain).

In an embodiment, the crosslinkable polymer composition comprises a first polymer comprising repeating units of formula (I) and (II)

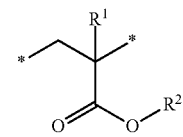

(I)

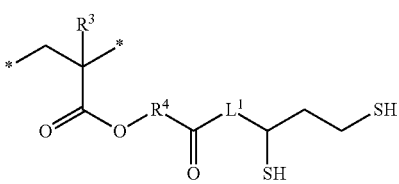

(II)

wherein $R^1$ and $R^3$ are independently at each occurrence hydrogen or methyl; $R^2$ is a $C_{4-12}$ alkyl group or a group of the formula

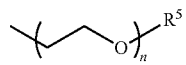

wherein $R^5$ is hydrogen or methyl and n is an integer from 1 to 230; $R^4$ is a $C_{1-14}$ alkylene group or a group of the formula

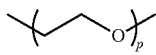

wherein p is an integer from 1 to 230, or 1 to 100, or 1 to 50, or 1 to 25, or 1 to 10, or 1 to 4; and $L^1$ is a $C_{1-12}$ alkylene group. Preferably the first polymer is a random copolymer comprising repeating units of formula (I) and (II). In some embodiments, $R^1$ is hydrogen. In some embodiments, $R^3$ is a methyl group. In some embodiments, $R^2$ is a $C_{4-12}$ alkyl group.

When $R^1$ is hydrogen and $R^2$ is a $C_{4-12}$ alkyl group, examples of monomers used to obtain the repeating units of formula (I) can include isooctyl acrylate, 2-ethyl hexyl acrylate, isononyl acrylate, decyl acrylate, dodecyl acrylate, butyl acrylate, hexyl acrylate, and the like, or a combination comprising at least one of the foregoing, preferably isooctyl acrylate, 2-ethylhexyl acrylate, isononyl acrylate, butyl acrylate, and combinations thereof. Such monomers can be particularly useful due to commercial availability and providing good pressure sensitive adhesive properties.

In some embodiments, $R^2$ is a group of the formula

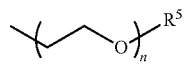

wherein $R^5$ is hydrogen and n is an integer from 1 to 10. In some embodiments, n is an integer from 1 to 100, or 1 to 50, or 1 to 25, or 1 to 10 (e.g., n is 1, 2, 3, 4, 5, 6, 7, 8, 9, or 10). In some embodiments, $R^5$ is hydrogen and n is 1 (i.e., the repeating units according to formula (I) can be derived from 2-hydroxyethyl acrylate). In some embodiments, $R^5$ is hydrogen and n is 5 to 10, or about 7 (e.g. the units according to formula (I) can be derived from a poly(ethylene glycol) acrylate). In some embodiments, $R^4$ is a group of the formula

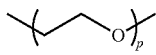

wherein p is 1. In some embodiments, $L^1$ is preferably a butylene group.

In some embodiments, the crosslinkable polymer composition comprises a first polymer comprising repeating units of formula (I) and (III)

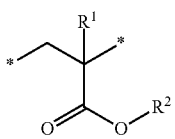

(I)

-continued

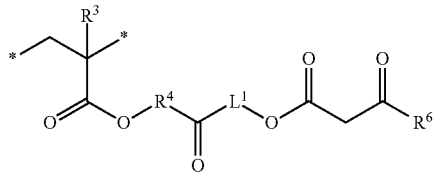

(III)

wherein $R^1$, $R^2$, $R^3$, $R^4$, and $L^1$ can be as described above. $R^6$ can be a $C_{1-6}$ alkyl group, and is preferably a methyl group.

In some embodiments, the crosslinkable polymer composition comprises a first polymer comprising repeating units of formula (I) and (IV)

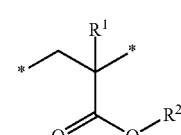

(I)

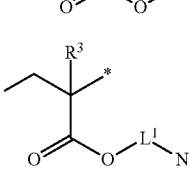

(IV)

wherein $R^1$, $R^2$, $R^3$, and $L^1$ can be as described above. In some embodiments, the repeating units according to formula (IV) can in the form of a salt, for example, the hydrochloride salt.

In some embodiment, the crosslinkable polymer composition can comprise a first polymer and a second polymer, wherein the first and second polymer feature complementary reactive functionalities which can covalently crosslink when pressure is applied to the crosslinkable polymer composition, a time sufficient to cure the crosslinkable polymer composition has passed, or both. For example, the crosslinkable polymer composition can comprise a first polymer comprising a crosslinkable functional group of formula (III) as described above and a second polymer comprising a crosslinkable functional group of formula (IV) as described above. Other complementary crosslinkable functional groups are also contemplated, as described above.

In some embodiments, repeating units according to formula (I) can be present in an amount of 60 to 99 mole percent, or 70 to 99 mole percent, or 80 to 95 mole percent and repeating units derived from a monomer comprising an ethylenically unsaturated group and a crosslinkable functional group (e.g., repeating units according to formula (II), (III), or (IV)) can be present in an amount of 1 to 40 mole percent, or 1 to 30 mole percent, or 5 to 20 mole percent, wherein weight percent of each component is based on the total moles of repeating units according to formula (I) and repeating units derived from a monomer comprising an ethylenically unsaturated group and a crosslinkable functional group.

The copolymer of the crosslinkable polymer composition can have a number average molecular weight of 1,000 to 100,000 grams per mole, or 5,000 to 50,000 grams per mole, or 5,000 to 25,000 grams per mole. Molecular weight of the copolymer can be determined, for example, using gel permeation chromatography relative to poly(ethylene glycol), poly(methyl methacrylate), or polystyrene standards.

In some embodiments, the crosslinkable polymer composition further comprises repeating units derived from a multifunctional crosslinker comprising, on average, at least two polymerizable groups according to formula (V)

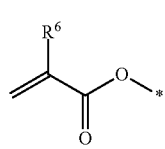

(V)

wherein $R^6$ is hydrogen or methyl, preferably methyl. In some embodiments, the multifunctional crosslinker preferably comprises a difunctional poly(ethylene glycol) crosslinker of formula (VI)

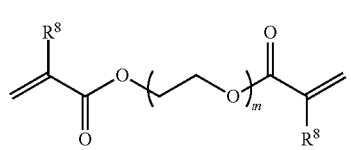

(VI)

wherein $R^8$ is hydrogen or methyl and m is an integer from 1 to 230, or 1 to 100, or 1 to 50, or 1 to 25. It can be preferred that the polymer composition remain soluble and flowable in solution or in the melt. Accordingly, when present, repeating units derived from the multifunctional crosslinker are generally present in an amount of less than or equal to 1 weight percent based on the total weight of the crosslinkable polymer composition, for example 0 to 1 weight percent, or greater than 0 to less than 1 weight percent, or 0.01 to less to 1 weight percent.

In addition to repeating units of formula (I) and repeating units derived from a monomer comprising an ethylenically unsaturated group and a crosslinkable functional group (e.g., repeating units of formula (II), (III), or (IV)), and optionally repeating units derived from the multifunctional crosslinker, the crosslinkable polymer composition can optionally further comprise repeating units derived from an ethylenically unsaturated monomer in an amount effective to increase the glass transition temperature of the crosslinkable polymer composition. Thus, this glass transition temperature-modifying monomer preferably has a glass transition temperature that is greater than the glass transition temperature of the crosslinkable polymer composition without the ethylenically unsaturated monomer. Exemplary ethylenically unsaturated monomers that can optionally be included in the crosslinkable polymer composition include polar monomers, nonpolar monomers, and combinations thereof. Useful polar monomers include acrylamides, substituted acrylamides, acrylic acid, N-vinyl caprolactam, hydroxyalkyl acrylates such as 2-hydroxy ethyl acrylate; N-vinylpyrrolidone, N,N-dimethylacrylamide, acrylonitrile, methacrylic acid, itaconic acid, and the like, and combinations thereof. Preferred, polar monomers comprise acrylic acid acrylamide, N-vinyl-2-pyrrolidone, N-vinyl caprolactam, 2-hydroxyethylacrylate, and combinations thereof. Non-polar monomers that are useful can include cyclohexyl acrylate, trimethylcyclohexyl acrylate, dicyclohexadienyl acrylate, isobornyl acrylate, methyl acrylate, ethyl acrylate, derivatives thereof, and the like and combinations thereof.

The amount of such a modifying monomer depends on the identity of the particular modifying monomer, and the remaining components of the crosslinkable polymer composition, and can be readily determined by a person having skill in the art. In some embodiments, the modifying monomer, when present, can be included in an amount of 1 to 25 weight percent, or 1 to 10 weight percent, or 1 to 5 weight percent, based on the total weight of the crosslinkable polymer composition.

In some embodiments, the polymer of the crosslinkable polymer composition can optionally further comprise a shielding monomer selected to hinder the crosslinking of the crosslinkable functional group. The shielding effect can be by, for example, steric hindrance. In some embodiments, an exemplary shielding comonomer can comprise a poly(ethylene glycol) methacrylate, preferably a poly(ethylene glycol) monoether methacrylate. Use of such a monomer is further described in the working examples below.

A method of making the crosslinkable polymer composition represents another aspect of the present disclosure. The method comprises copolymerizing a first monomer of formula (VII)

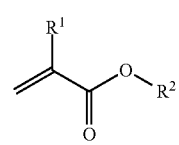

(VII)

and a monomer comprising an ethylenically unsaturated group and a crosslinkable functional group, as described above. In a specific embodiment, the method comprises copolymerizing a first monomer of formula (VII) and a second monomer of formula (VIII)

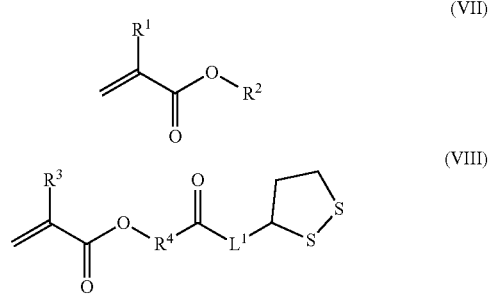

wherein $R^1$ and $R^3$ are independently at each occurrence hydrogen or methyl; $R^2$ is a $C_{4-12}$ alkyl group or a group of the formula

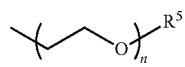

wherein $R^5$ is hydrogen or methyl and n is an integer from 1 to 230, or 1 to 100, or 1 to 50, or 1 to 25, or 1 to 10 (e.g., n is 1, 2, 3, 4, 5, 6, 7, 8, 9, or 10); $R^4$ is a $C_{1-14}$ alkylene group or a group of the formula

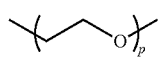

wherein p is an integer from 1 to 230, or 1 to 100, or 1 to 50, or 1 to 25, or 1 to 10, or 1 to 4 ; and $L^1$ is a $C_{1-12}$ alkylene group to provide a disulfide-containing polymer comprising repeating units of formula (VIIA) and (VIIIA)

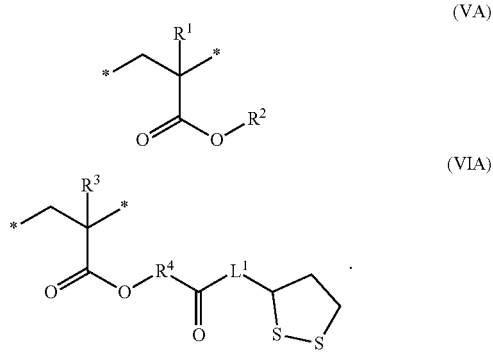

In another specific embodiment, the method comprises copolymerizing a first monomer of formula (VII) and a second monomer of formula (IX) or a first monomer of formula (VII) and a second monomer of formula (X)

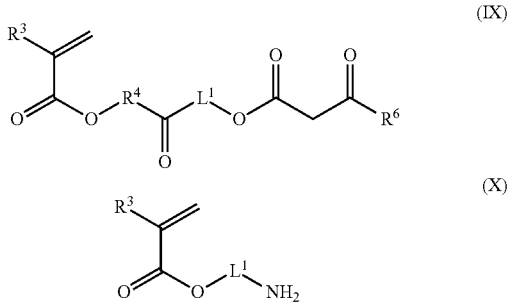

wherein $R^3$, $R^4$, $L^1$ and $R^6$ are as defined above.

Polymerizing the first and the second monomers can be by any polymerization methods that are generally known, for example, by free radical polymerization techniques or controlled free radical polymerization techniques (e.g., reversible addition-fragmentation transfer polymerization (RAFT), atom transfer radical polymerization (ATRP), and the like).

When the polymer is the disulfide-containing polymer, the method can further comprise reducing the disulfide-containing polymer to provide the crosslinkable polymer composition. The disulfide bonds can be reduced to free thiols using methods that are generally known. For example, reducing the disulfide groups can be by reaction with a reducing agent such as cysteine, cysteamine, dithiothreitol, dithioerythritol, glutathione, 2-mercaptoethanol, 3-mercaptopropionic acid, a phosphine such as tris-(2-carboxyethyl-phosphine) ("TCEP"), or sodium borohydride. Reducing the disulfide bonds can provide a polymer wherein substantially all of the thiols are in the free thiol form as opposed to the disulfide form. For example, at least 85% or at least 90%, or at least 95%, or at least 99% of the thiols can be in free thiol form in the crosslinkable polymer composition. Stated another way, the crosslinkable polymer composition can comprise up to 15%, or up to 10%, or up to 5%, or up to 1% of repeating units in which the disulfide bond is retained. Preferably, the crosslinkable polymer composition comprises less than 5%, or less than 1% of repeating units in which the disulfide bond is retained. Reduction of the disulfide-containing polymer to the crosslinkable polymer comprising the free thiol groups can be monitored or confirmed using proton nuclear magnetic resonance CH NMR) spectroscopy. Additionally, free thiol content in the crosslinkable polymer composition can be quantified, for example, using Ellman's reagent (5,5'-dithiobis-(2-nitrobenzoic acid) or DTNB).

The crosslinkable polymer composition described herein can be crosslinked, for example, to form a polymer network by oxidation of free thiols to disulfide groups. Specifically, crosslinks can form from interchain thiol-thiol reaction to form a plurality of interchain disulfide bonds. Oxidation of the crosslinkable polymer composition can occur spontaneously over time. For example, in some embodiments, oxidation to form the corresponding crosslinked polymer composition via disulfide linkages can be over a period of 15 minutes to 60 hours. In some embodiments, oxidation of the crosslinkable polymer composition can be by application of pressure to the composition. Without wishing to be bound by theory, it is believed that application of an external strain to the polymer composition can result in reactive thiol groups being brought into close proximity, accelerating the inter-chain crosslinking and stiffening to provide the crosslinked polymer composition.

In some embodiments, the crosslinkable polymer composition can be crosslinked by reaction of complementary functional groups, for example on a first and second polymer present in the composition. Exemplary complementary functional groups can be, for example, amine and acetoacetoxy groups, as described above, and in the working examples below. Reaction of the complementary functional groups can occur spontaneously over time. For example, in some embodiments, a crosslinking reaction to form the corresponding crosslinked polymer composition can be over a period of 15 minutes to 60 hours. In some embodiments, crosslinking can be facilitated by the application of pressure to the composition. Without wishing to be bound by theory, it is believed that application of an external strain to the polymer composition can result in reactive groups being brought into close proximity, accelerating the inter-chain crosslinking and stiffening to provide the crosslinked polymer composition.

As described above, the ability of the crosslinkable polymer composition of the present disclosure to undergo spontaneous crosslinking or crosslinking via an externally applied strain, for example inducing the formation of disulfide bonds, lends the crosslinkable polymer composition for use in pressure sensitive adhesives. As used herein, the term "pressure-sensitive adhesive" refers to a viscoelastic material which adheres instantaneously to most substrates with the application of slight pressure and remains permanently tacky. Accordingly, another aspect of the present disclosure is a pressure sensitive adhesive comprising a crosslinked polymer composition derived from the crosslinkable polymer composition described herein. As described above, some embodiments of the corresponding crosslinked polymer composition can comprise a plurality of disulfide crosslinks formed between repeating units of formula (II). The crosslinked polymer composition can therefore comprise repeating units, for example, according to formula (I) and formula (XI) or (XII)

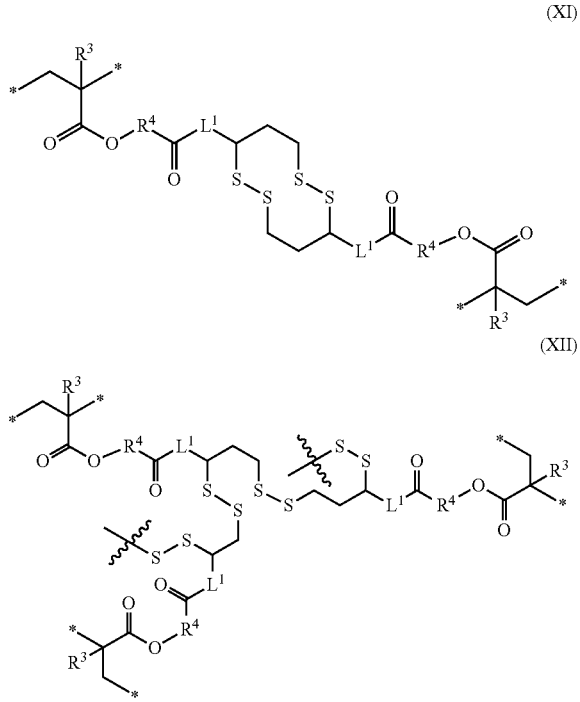

wherein $R^3$, $R^4$, and $L^1$ are as defined above. It is understood that there can be many possible resulting structures arising from the various ways in which the thiol-containing monomers can react to form the disulfide cross-linked network. Formulas (XI) and (XII) are meant to illustrate representative crosslinked structures and are non-limiting. In some embodiments, the crosslinked polymer can optionally further comprise repeating units according to formula (II). Stated another way, the crosslinked polymer can optionally comprise repeating units comprising free thiols in the unoxidized form. Preferably, the amount of repeating units according to formula (II) is small, for example less than 5 mol %, or less than 1 mol %.

In some embodiments, a compound comprising at least two alkenyl groups capable of reacting with the crosslinkable polymer composition to form a plurality of thioether bonds (e.g., —S—CH$_2$—) can be added to the crosslinkable polymer composition. Thus, the crosslinkable polymer composition can alternatively be crosslinked via thioether bond formation through a "thiol-ene" reaction. In some embodiments, the thiol-ene crosslinking can include exposing the crosslinkable polymer composition including the compound comprising at least two alkenyl groups to ultraviolet radiation, heat, or both. In some embodiments, a radical initiator can be employed to facilitate thiol-ene crosslinking. The radical initiator can be a photoinitiator, for example, a benzoin ether (e.g., benzoin methyl ether or benzoin isopropyl ether), substituted benzoin ethers (e.g., anisoin methyl ether), substituted acetophenones (e.g., 2,2-diethoxyacetophenone and 2,2-dimethoxy-2-phenylacetophenone), substituted alpha-ketols (e.g., 2-methyl-2-hydroxypropiophenone), aromatic sulfonyl chlorides (e.g., 2-naphthalene sulfonyl chloride), and photoactive oximes (e.g., 1-phenyl-1,2-propanedione-2-(O-ethoxycarbonyl) oxime.

In some embodiments, the crosslinked polymer composition can comprise both thioether and disulfide crosslinks.

The pressure sensitive adhesive can be a pressure sensitive adhesive tape, label, decal, sticker, medical patch or device, wound dressing, and the like. In some embodiments, the pressure sensitive adhesive can comprise a substrate and an adhesive layer comprising the crosslinked polymer composition disposed on at least a portion of a surface of the substrate.

The substrate can be selected depending on the desired use. The substrate can be flexible or non-flexible (e.g., rigid), and can be tailored to suit a given application. The substrate can be, for example, a polymer film, paper, a glass substrate, an inorganic substrate, a ceramic substrate, a silicon wafer, a fabric sheet, a painted surface, wood, cardboard, fiberboard, or any combination thereof. In an exemplary embodiment, the substrate is a glass substrate. In some embodiments, a flexible substrate can be preferred. For example, the flexible substrate can be a polymer film, for example low density polyethylene, linear low density polypropylene, oriented polypropylene, polyester (e.g., poly(ethylene terephthalate) (PET)), nylon, vinylacetate, polyvinyl chloride, metallized polyester, polyamides, polyurethanes, or the like.

In some embodiments, the substrate can be a release liner, for example a silicone release paper, and the pressure sensitive adhesive can be used as a transfer tape. For example, in use, the exposed surface of the adhesive layer (i.e., opposite the release liner substrate) can be placed in contact with a second substrate, and light pressure applied. The release liner can be removed (e.g., peeled away) and the newly exposed surface of the adhesive layer can be bonded to a third substrate.

The crosslinkable polymer composition can be coated on the substrate using any type of coating process. For example, the crosslinkable polymer composition can be dissolved in a solvent and coated on the substrate by solvent casting, spin coating, drop casting, ink jetting, doctor blading, dip coating, brushing, spray coating, knife coating, curtain coating, and the like. The crosslinkable polymer composition can also be coated using any type of coating machine, for example, a three-roll, gravure, reverse gravure, meyer rod, slot die, or knife over roll. Suitable solvents useful for coating the polymer composition on a substrate can be selected depending on the polymer composition and its solubility. In some embodiments, the solvent can be an organic solvent, for example, an aliphatic hydrocarbon solvent (e.g., cyclopentane, n-pentane, 2-methylbutane, cyclohexane, methylcyclopentane, n-hexane, 2-methylpentane, 3-methylpentane, 2,2-dimethylbutane, 2,3-dimethylbutane, methylcyclohexane, ethylcyclopentane, n-heptane, 2-methylhexane, 3-methylhexane, 2,2-dimethylpentane, 2,3-dimethylpentane, 2,4-dimethylpentane, 3,3-dimethylpentane, 3-ethylpentane, and the like), an aromatic hydrocarbon solvent (e.g., benzene, toluene, ortho-xylene, meta-xylene, para-xylene, ethylbenzene, and the like), ester solvents (e.g., ethyl acetate, and the like), ketone solvents (e.g., acetone, methyl ethyl ketone), alcohol solvents (e.g., methanol, ethanol, iso-propanol, and the like), polar aprotic solvents (e.g., dimethyl sulfoxide, N-methylpyrolidone, dimethylformamide, sulfolane, dimethylacetamide, and the like), and halogenated solvents (e.g., dichloromethane, chloroform, ethylene dichloride, and the like). In some embodiments, aqueous solvents can also be used. Combinations of any of the foregoing solvents are also contemplated. The crosslinkable polymer composition can be combined with the solvent to prepare a coating composition where the crosslinkable polymer is present in an amount of 0.1 to 75 weight percent, or 0.1 to 60 weight percent, or 0.1 to 50 weight percent, or 0.1 to 40 weight percent, or 0.1 to 25 weight percent, or 0.1 to 10 weight percent, or 0.1 to 5 weight percent, based on the total weight of the crosslinkable polymer composition and the solvent.

The crosslinkable polymer composition can also be coated in the melt state, for example, by extruding, dip coating, brushing, or the like (i.e., where no solvent is used for coating).

The viscosity of the crosslinkable polymer composition can be adjusted by, for example, selecting a particular solvent or by adjusting the concentration of the crosslinkable polymer composition in the solvent during coating to obtain a viscosity appropriate for the coating method to be used. To provide suitable coatings, the crosslinkable polymer composition can have a viscosity of, for example, 10 to 10,000 mPa.

The pressure sensitive adhesive can optionally further include, diluents, emollients, plasticizers, excipients, antioxidants, UV stabilizers, anti-irritants, opacifiers, fillers, such as clay and silica, pigments and mixtures thereof, preservatives, as well as other components or additives that are generally known in the art. Such components can be included in the pressure sensitive adhesive in amounts that are generally known to be effective.

A pressure sensitive adhesive can be prepared by contacting a substrate with the crosslinkable polymer composition. The crosslinkable polymer composition can be in solution or in the melt. Contacting the substrate with the composition forms a coating of the polymer composition disposed on at least a portion of a surface of the substrate. Coating methods are described above. The method further comprises curing the crosslinkable polymer composition to provide the pressure sensitive adhesive comprising the corresponding crosslinked polymer composition (e.g., crosslinked via disulfide bonds, thioether bonds, or a combination thereof). Curing the crosslinkable polymer composition can comprise applying pressure to the coated substrate to facilitate crosslinking via disulfide formation. In some embodiments, curing via disulfide formation can be spontaneous and comprises waiting for a time sufficient to cure the crosslinkable polymer composition, as described above. In some embodiments, curing comprises exposing the coated layer which comprising the crosslinkable polymer composition and a compound comprising at least two alkenyl groups to heat, UV irradiation, or both, optionally in the presence of a radical initiator to form stable (irreversible) thioether crosslinks. In some embodiments, no external heat or UV treatment is required to generate the pressure sensitive adhesives of the present disclosure.

In some embodiments, the crosslinkable polymer composition can be useful for coatings, for example on any of the above described substrates. In some embodiments, the crosslinkable polymer composition can be prepared in a suitable solvent, and directly coated on a substrate using any of the above described coating processes, and shear or time induced crosslinking can provide the corresponding crosslinked coating. In some embodiments, for example when water is used as a solvent, the crosslinkable polymer composition can be prepared as a dispersion in water, and the dispersion can further comprise a second crosslinkable polymer or water soluble additive comprising the complementary functional group to effect crosslinking. Upon drying of the aqueous-based system, the crosslinkable functional groups can be forced into contact, where, without wishing to be bound by theory, the "shearing" event is driven by water evaporation, to induce crosslinking and provide the corresponding crosslinked coating.

Accordingly, the present inventors have unexpectedly discovered a novel crosslinkable polymer composition that is particularly useful for generating new pressure sensitive adhesives. Advantageously, the presently disclosed polymer composition can crosslink (reversibly) via formation of interchain linkages (e.g., disulfide linkages) spontaneously over time or with application of light pressure. This composition can therefore overcome some of the technical limitations associated with presently known pressure sensitive adhesive compositions that require UV irradiation, heat, or both to generate the crosslinked pressure sensitive adhesive material. Thus, the present compositions provide new opportunities for use with temperature sensitive or porous substrates, and can be produced using a simple, low cost method. Furthermore, due to the nature of the crosslinking via disulfide formation, formation of undesired or toxic byproduct residues that may arise from typical crosslinking processes used for known pressure sensitive adhesives is eliminated. Additionally, the use of opaque crosslinkable formulations is also enabled by the present disclosure. Therefore, a significant improvement in crosslinkable polymer compositions, particularly for use in pressure sensitive adhesives, is provided by the present disclosure.

The invention is further illustrated by the following non-limiting examples.

EXAMPLES

Disulfide Crosslinking

Inspired by the force-induced arrangement of disulfide bonds in proteins, the present inventors have developed a self-reinforcing material reliant on reversible chemical crosslinks. Initial experiments to demonstrate crosslinking induced by mechanical activation were based on crosslinked polymer networks (i.e., also containing irreversible covalent crosslinks). Using this initially crosslinked system allowed the inventors to further characterize the benefits of the reversible disulfide crosslinking within the network system.

Figure 2:
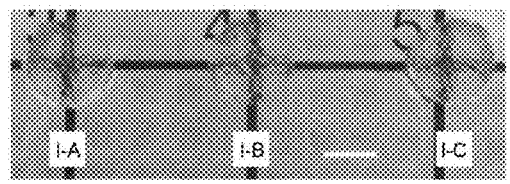
FIG. 2 shows a photograph of optically clear gels from Set I after swelling for 5 days in 1:4 (v:v) ethanol:DMSO. Scale bar: 3 millimeters.

A dihydrolipoic acid (DHLA)-based methacrylate was integrated into the networks to impart reversible inter-chain disulfide crosslinks. As a typical example of such a network, gels were prepared with an acrylate backbone containing pendant PEG (PEG acrylate, PEGA, with lipoic acid (2-hydroxyethyl methacrylate-lipoic acid, HEMA-LA) groups as the cryptic site containing monomer. The chemical structures of HEMA-LA, PEGA, PEGDMA, and HEA are provided in FIG. 1. The effects of gel structure and composition were investigated by varying crosslinker ("CL") and co-monomer (monomers "M1" and "M2") chain lengths across material Sets I-III, shown in Table 1. Molecular weights for the crosslinker and monomer 1 in Table 1 are provided in grams per mole. Within each set, by varying monomer composition across Groups A-C, shown in Table 2. Samples are denoted using the code "X-Y", where "X" is the gel set and "Y" is the gel group. At a fixed crosslinker concentration of 0.129 Molar, these gels were transparent, as can be seen with representative gels from Set I shown in FIG. 2. Schematic illustrations of molecular changes in gel network during disulfide reduction followed by mechanical deformation are shown as a function of co-monomer (M1) molecular weight (or chain length) in FIG. 3.

TABLE 1

| Gel Set | CL (molecular weight) | M1 (molecular weight) | M2 |
| --- | --- | --- | --- |
| I | PEGDMA (330) | HEA (116) | HEMA-LA |
| II | PEGDMA (750) | HEA (116) | HEMA-LA |
| III | PEGDMA (330) | PEGA (375) | HEMA-LA |

TABLE 2

| Group | [CL]:[M1]:[M2] Ratio | [CL][1] | [M1][1] | [M2][1] |
| --- | --- | --- | --- | --- |
| A | 1:12:1 | 0.129 | 1.55 | 0.129 |
| B | 1:11:2 | 0.129 | 1.42 | 0.258 |
| C | 1:10:3 | 0.129 | 1.29 | 0.387 |

[1]Crosslinker and comonomer concentrations are provided as molar concentrations (M).

Figure 3:
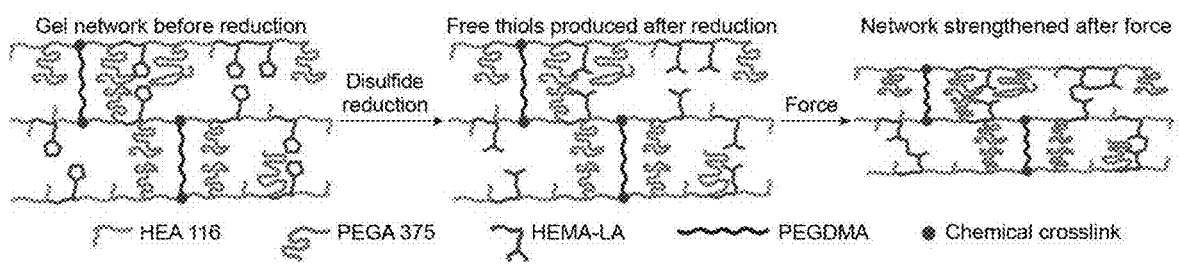
FIG. 3 is a schematic illustration of gel networks of different co-monomer molecular weights. Under applied force, short M1 groups (HEA 116) allow inter-chain crosslinking while long M1 groups (PEGA 375) limit disulfide formation.

To prepare the latent crosslinking gels, networks of X-Y composition were first prepared. The cyclic disulfides were reduced to pendant thiols by adding a dilute solution of sodium borohydride. This would theoretically facilitate inter-chain disulfide reactions to form new crosslinks after the application of stress to the network, as shown in FIG. 3. Moreover, variation of M1 chain length could influence the strain-stiffening behavior of reduced gels, in which short M1 groups would more easily allow inter-chain crosslinking under force while long M1 groups might shield free thiols from crosslinking by disulfide formation.

Figure 4:
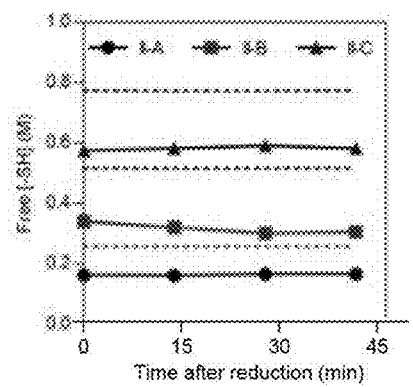
FIG. 4 shows free thiol concentration as a function of time post-reduction. Solid lines represent experimental data, and dashed lines represent theoretical thiol concentration at 100% yield of reduction.
Figure 5:
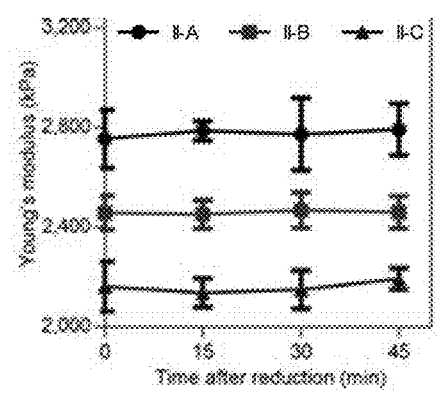
FIG. 5 shows Young's modulus as a function of time post-reduction for short response times.
Figure 6:
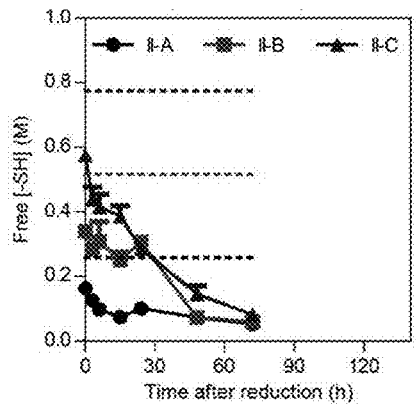
FIG. 6 shows free thiol concentration as a function of time post-reduction. Solid lines represent experimental data, and dashed lines represent theoretical thiol concentration at 100% yield of reduction.
Figure 7:
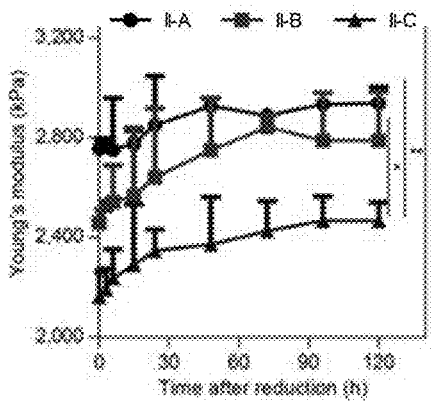
FIG. 7 shows Young's modulus as a function of time post-reduction for long response times.

After disulfide reduction, gels were immersed in 1:4 (v:v) ethanol:dimethyl sulfoxide (DMSO) under ambient conditions to promote oxidation of thiols to disulfides as a crosslinking mechanism. Gel performance, such as optimization of reduction time and yield, thiol quantification, and swelling behavior, was characterized. The optimal reduction time was determined to be 6 hours. Gels also deswelled about 1 day after the reduction, indicating that thiol crosslinking occurred over time. Free thiol concentration was quantified by Ellman's assay, and Young's modulus was measured by compression testing at various time points post-reduction. Within 1 hour, the changes in thiol concentration were negligible in all groups of gels from Set II, as shown in FIG. 4, and no changes were observed in stiffness, as shown in FIG. 5. Within 5 days, significant declines in thiol concentration due to the disulfide formation accompanied increases in gel stiffliess as shown in FIG. 6, indicating that some proportion of the disulfide bonds provided inter-chain crosslinks (FIG. 7). Approximately 3 hours were needed for the disulfide crosslinks to start to form.

Figure 8:
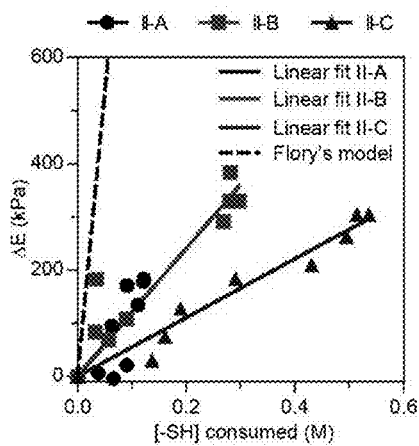
FIG. 8 shows the correlation between the increase in stiffness of reduced gels and thiol consumption. Solid lines: experimental data with their corresponding linear fits; dashed line: Flory's theory of elastic model.

An increase in stiffness was determined to correlate to a decrease in free thiol concentration associated with disulfide formation and crosslinking. Based on the established relationship between elastic modulus and degree of crosslinking, the Flory model shown as Equation 1 was compared to the present data on available thiols to measured modulus, shown in FIG. 8.

$$G = \frac{\rho RT}{M_c}\left(1 - \frac{2M_c}{M}\right) \quad \text{Equation 1}$$

In Equation 1, G is the shear modulus, p is the density of the network, R is the gas constant per mole, T is the temperature, $M_c$ is the mean molecular weight of the chains, and M is the molecular weight of the primary molecules before crosslinking. Given that the present data yielded less than the ideal 100% conversion assumed by the Flory model, we believe, without wishing to be bound by theory, that spontaneous crosslinking resulted in both inter- and intra-chain disulfide bonds. Group II-C showed lower conversion of inter-chain disulfides compared to Groups II-A and II-B, possibly due to higher initial thiol density, creating thiol crowding and reformation of cyclic disulfides.

Figure 9:
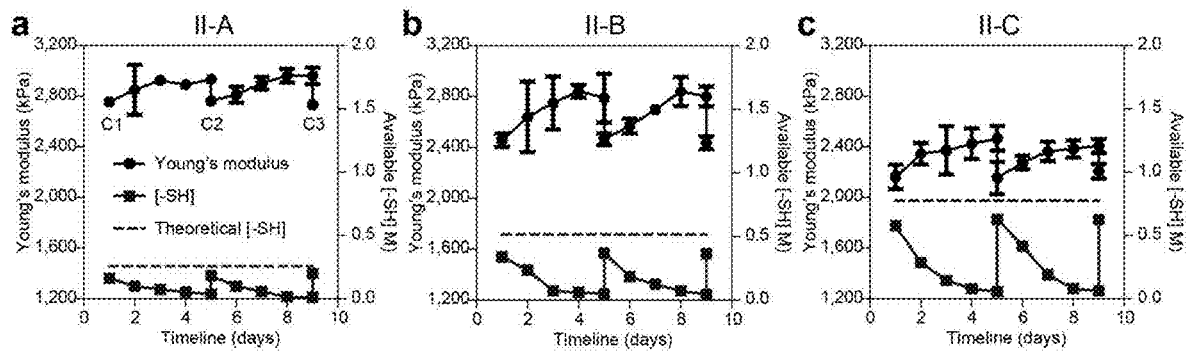
FIG. 9 shows recovery of thiols (squares) and Young's modulus (circles) over three oxidation-reduction exchange reactions from Set II with different gel compositions. Cycles 1, 2, and 3 started on Days 1, 5, and 9, respectively. (a) Set II-A (low [-SH]). (b) Set II-B (intermediate [-SH]). (c) Set II-C (high [-SH]).

The labile disulfide crosslinks were expected to be reversible and amenable to repeated stiffening and weakening by toggling the oxidation-reduction exchange reactions. Indeed, the gels showed complete reversibility of the disulfide crosslinks and Young's modulus over three cycles (shown in FIG. 9). First, gels were reduced to convert the cyclic disulfides to free thiols ("Day 1"). Thiol-containing gels were then allowed to form intra-chain or inter-chain disulfides through oxidation by continuous purging of air into the system. Gel stiffness and thiol concentration were measured daily for 4 days until most thiols were oxidized, and no significant change in stiffness was observed. The second ("Day 5") and third ("Day 9") cycles were carried out in the same manner on the same gels. Gels underwent multiple reduction-oxidation cycles without deterioration, highlighting the reversibility of the process. In fact, thiol concentration and Young's modulus of gels after each reduction showed effectively 100% recovery, i.e., no significant differences in thiol concentration and stiffness were observed on Days 1, 5, and 9. This reversible behavior is markedly distinct from previous reports of covalently crosslinked gels, which showed complete crosslinking/decrosslinking of all covalent bonds in the network via sol-gel transition.

Figure 10:
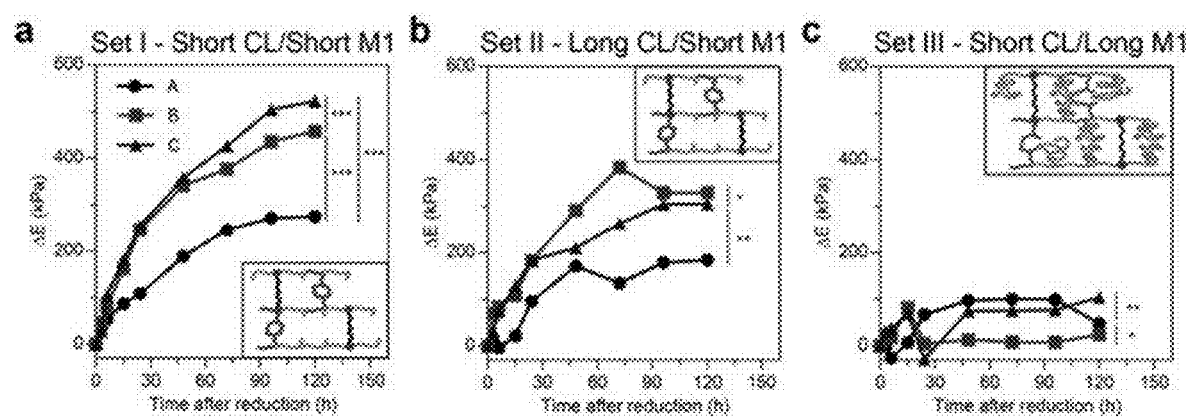
FIG. 10 shows the shielding effect on gel stiffening via long dangling monomers. (a) Change in Young's modulus ΔE over time post-reduction for Set I (short CL, short M1). (b) Change in Young's modulus ΔE over time post-reduction for Set II (long CL, short M1). (c) Change in Young's modulus ΔE over time post-reduction for Set I (short CL, long M1). Insets are schematic illustrations of disulfide formation in gel networks during oxidation

The crosslinker and co-monomers compositions were manipulated to control spontaneous crosslinking behavior. The M1 molecular weights were 116 and 375 grams per mole, while the crosslinker molecular weights were 330 and 750 grams per mole. As shown in FIG. 10, gels increased in stiffness at a modest rate over time for the combinations of short CL/short M1 used in Set I (FIG. 10a) and of long CL/short M1 used in Set II (FIG. 10b), but a smaller increase in stiffness was observed in the combination of short CL/long M1 used in Set III (FIG. 10c). These results indicated that gels composed of long co-monomer M1 provided "screening" of spontaneous inter-chain crosslinking while short M1 allowed more rapid intermolecular disulfide bond formation.

The crosslinker chain length did not significantly affect the formation of new, spontaneous crosslinks. The molar ratio of crosslinker to total monomer integrated in all groups of gels was 1:13, meaning the crosslinker had little control over thiol activity. Based on literature reports, the disulfide bonds were expected to remain stable under tensions of several hundred pN, which is larger than those based on hydrophobicity, but still well below the forces of several nN required to rupture C—C bonds in the polymer backbone. After the reduction, the expectation was that some pendant thiols would form inter-chain crosslinks with other thiols over time, increasing the gel stiffness. Hence, stiffness could be increased further by placing the gels under compression, accelerating inter-chain thiol crosslinking instead of reforming the cyclic disulfide rings. In contrast, long M1 slowed inter-chain crosslinking, and gave gels with no detectable changes in stiffness. Instead, the presence of these shielding groups biased the system toward cyclic disulfide reformation and no thiol was detected in oxidized gels.

Figure 11:
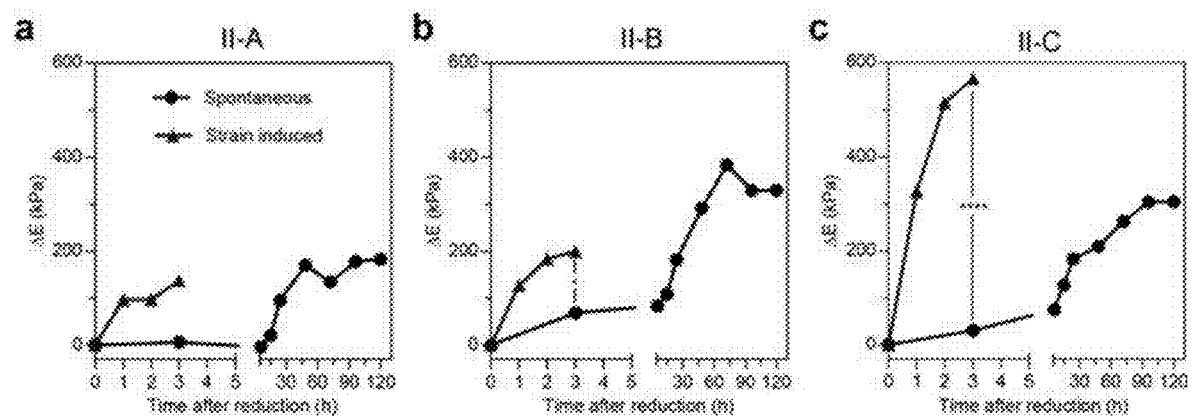
FIG. 11 shows the strain induced latency of intermolecular disulfide crosslinks. The change in Young's modulus post-reduction under strain (triangles) for 3 hours is compared to the spontaneous state (circles) using Set II. (a) Set II-A. (b) Set II-B. (c) Set II-C.

Besides spontaneous crosslinking, labile thiols in the networks were also responsive to mechanical strain. The increase in Young's modulus of strain-stiffening gels accelerated with applied stress. Under compression, inter-chain crosslinking resulted in faster stiffening than was observed in the spontaneous state (FIG. 11). At equivalent times post-reduction, the increase in Young's moduli under strain was greater than those of unstrained gels. We hypothesize that under deformation, the reactive groups were brought into close proximity, accelerating inter-chain crosslinking and stiffening. Gels with lower thiol content (FIG. 11a, b) exhibited smaller increases in stiffness (FIG. 11c), since fewer crosslinks produce weaker networks. This result indicated that the strain-responsive nature of the gels allows accurate control over stiffness though thiol density.

These experimental results were compared to Flory's model of elastic systems using gels from Set II that are composed of long CL and short M1. For all groups of gels in Set II, the increase in stiffness from gels under strain approached Flory's model more closely than unstrained gels. Reduced gels with higher free thiol concentration gave greater increases in Young's modulus, ranging from 150 kPa in a low thiol concentration (II-A) to 600 kPa in a high thiol concentration (II-C). Moreover, most inter-chain thiol crosslinking occurred during the first 2 hours, then slowed when most of the available thiols were consumed (FIG. 11). Notably, the increase in stiffness of II-C gels under strain after 3 hours was greater than that of gels without strain after 5 days. As noted in FIG. 8, II-C gels of highest thiol concentration tended to reform cyclic disulfides, resulting in the smallest increase in stiffness at a given thiol consumption. However, under cyclic deformation, these free thiols formed inter-chain disulfides faster than the unstrained gels.

Figure 12:
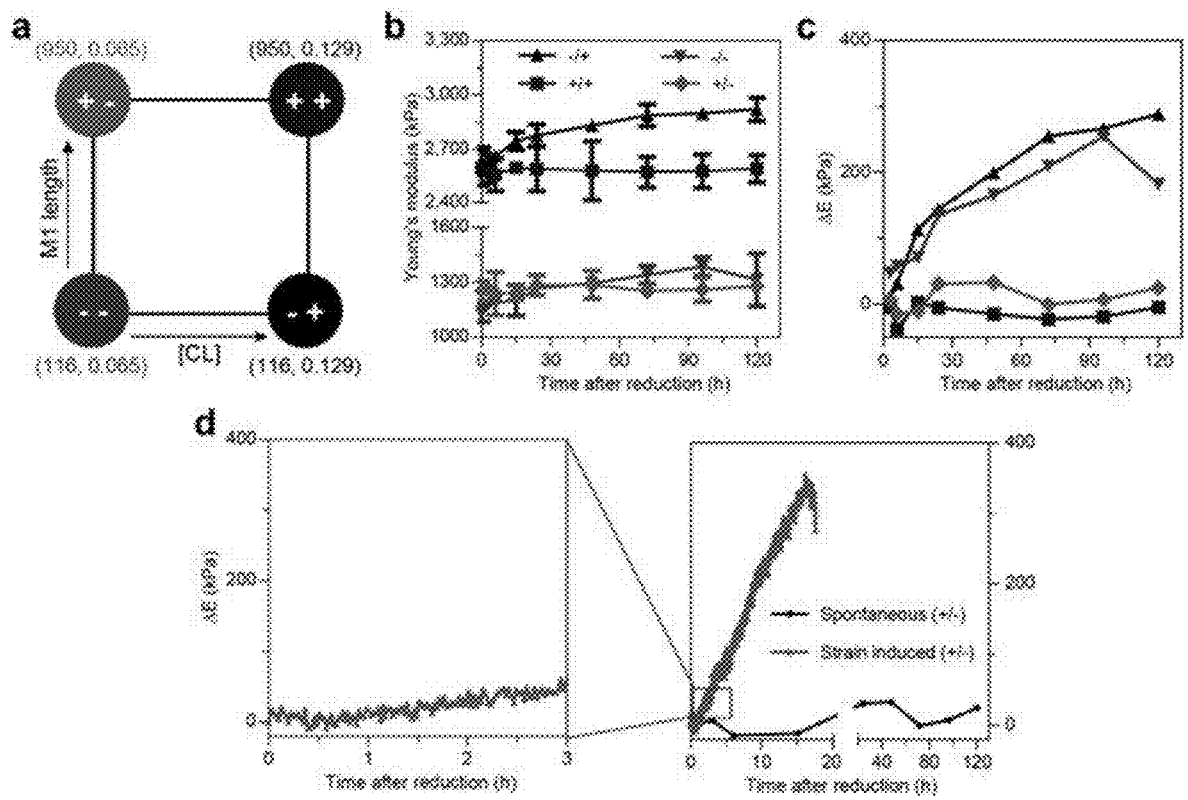
FIG. 12 shows suppression of shielding effect from long monomers under long-term deformation. (a) Illustration of experimental design using co-variation of two independent variables, co-monomer chain length and crosslinker concentration, each varied between two levels called low and high levels, denoted as − and +, respectively. (b) Time dependence of Young's modulus for different gel compositions listed in (a). (c) Change in Young's modulus post-reduction compared to the initial stiffness. (d) Long-term strain stiffening on (+/−) gel over 3 hours (left) and 18 hours (right, green triangles) compared to spontaneous state (black circles).

The effect in gel stiffening was further investigated by covariation between two factors, co-monomer M1 chain length and crosslinker concentration; each was varied between two levels, denoted as "−" for low levels and "+" for high levels (FIG. 12a). We tested four unique gel compositions, denoted as L1/L2, where L1 and L2 were the levels for the M1 molecular weight and crosslinker concentration, respectively (FIG. 12a). The levels for M1 molecular weight were 116 grams per mole (HEA) and 950 grams per mole (PEG methyl ether methacrylate, PEGMEMA), and those for crosslinker concentration were 0.065 M and 0.129 M. The crosslinker was PEG diacrylate (PEGDA, average $M_n$ 700), and the concentrations of M1 and M2 (HEMA-LA) were fixed at 1.29 M and 0.387 M, respectively. For groups that contained the same crosslinker concentration, i.e. +/− and −/−, or +/+and −/+, the Young's moduli of gels immediately after reduction (t=0), termed "starting moduli," were similar due to equal volume fraction of polymer in the gels (FIG. 12b). However, the stiffening behavior over time was only observed in gels with shorter M1, i.e. −/− and −/+, whereas no significant increase in stiffness occurred in gels with longer M1, i.e. +/+and +/−. This behavior was clearer when shown by the change in stiffness as a function of time post-reduction (FIG. 12c). As explained schematically in FIG. 3, the short co-monomer M1 allowed for strain-induced formation of new crosslinks between inter-chain thiols, while the long M1 groups acted as molecular shielding units, inhibiting inter-chain crosslinks even under applied force.

To determine whether the shielding effect could be overcome under strain, we selected the +/− gel to perform a cyclic compression test over 18 hours (FIG. 12d). The shielding effect resulting from bulky co-monomer M1 persisted under strain during the first 3 hours. However, the gel gradually stiffened by intermolecular crosslinking as stress was applied, giving this strain-induced gel a similarly large increase in Young's modulus to the gels composed of short M1 (Sets I and II) at a spontaneous state. This result could be used to develop a cryptic network that minimizes spontaneous stiffening but is accessible and stiffened during strain.

Thus the present inventors have demonstrated a strain-triggered stiffening synthetic gel network using polymers containing labile thiol crosslinks on an acrylate backbone with pendant PEG chains, which allowed for both spontaneous and strain-sensitive crosslinking. The labile nature of these thiol groups also allowed for reversibility of the crosslinks.

Based on the initial results demonstrating spontaneous and strain-sensitive crosslinking in materials containing free thiols, the present inventors further sought to demonstrate the utility of such materials as adhesives. Preferably, for use as an adhesive, the initial polymer composition will be soluble and flowable to allow for facile coating onto a substrate. Accordingly, the PEGDMA crosslinker used in the above experiments for initial proof of concept can be present in an amount of less than 1 weight percent, or omitted from the composition, such that the polymer composition retains flowability (either as a solution or in the melt).

Figure 13:
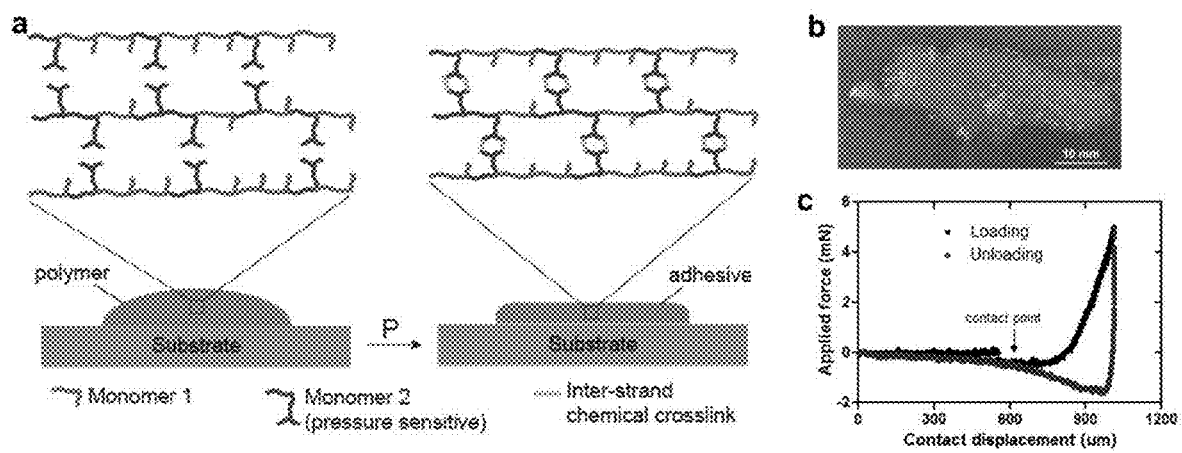
FIG. 13 shows a schematic illustration of a pressure sensitive adhesive (a), a pressure sensitive adhesive film formed on a glass slide (b), and force versus displacement for pressure-sensitive adhesive film performed by Contact Adhesion Test instrument using 5 mm diameter spherical probe (c).

A polymer was prepared from copolymerization of HEA and HEMA-LA. Subjecting the copolymer to treatment with sodium borohydride afforded the corresponding copolymer where substantially all of the disulfide groups have been converted to free thiol groups, as determined using $^1$H NMR spectroscopy. The copolymer contained 23.1 mole percent of the HEMA-LA comonomer. Following reduction, the copolymer solution in DMSO solvent was coated onto a glass slide to form a film, as shown in FIG. 13b. After coating on the substrate, application of pressure ("P") induces crosslinking via interchain disulfide formation, as shown schematically in FIG. 13a. The force versus displacement for the pressure sensitive adhesive film performed by Contact Adhesion Test instruction using a 5 millimeter diameter spherical probe is shown in FIG. 13c. Typical of load-displacement behavior for adhesives, the curve shown in FIG. 13c shows the effect of adhesion force. During the loading process, indentation depth is higher when adhesion is present thus adhesion forces contribute to the work of indentation. During unloading, adhesion forces oppose indentation process.

Thiol-ene Crosslinking

Thiol-ene chemistry was also explored as a route to produce crosslinked materials. For these examples, gels were first prepared from PEGDMA (330), HEA, and HEMA-LA using a ratio of 1:10:3 using the procedure described above. The gels were then subjected to reducing conditions to provide free thiols within the gel. The reduction was accomplished by dissolving 8 molar equivalents of sodium borohydride (relative to HEMA-LA) in a 1:4 ethanol: dimethylsulfoxide solution (total of 3 milliliters per gel) in a 50 mL conical tube. The solution was purged with nitrogen, and a gel was added to the tube. The tube was centrifuged at 200 G and room temperature for 10 minutes. The gels were transferred to a well plate and shaken on an orbital shaker at 280 RPM and at room temperature for 6 hours.

Poly(ethylene glycol) diacrylate (PEGDA) was used as an exemplary crosslinker containing ethylenic unsaturation. PEGDA (having a molecular weight of 258 grams per mole) and dimethylphenylphosphine (DMPP) as an exemplary phosphine catalyst were diffused into the gel. Each gel was placed into a micro centrifuge tube, and the solvent level was adjusted to 200 microliters. The samples were centrifuged at 7,000 to 8,000 RPM for 20 minutes. Cyclic compression-tension tests were performed at 30% strain and 10 um/s rate for three hours. The gels were then again exposed to reducing conditions and Ellman's test was performed to determined free thiol content in the final gels. Young's Modulus (E) and change in Young's Modulus (ΔE) over time were measured.

Figure 14:
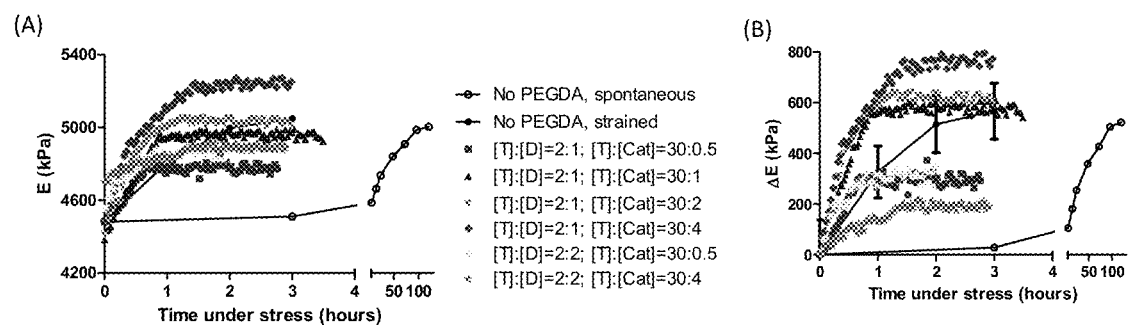
FIG. 14 shows (A) Young's modulus (E) over time of strained gels compared to gels without strain, and (B) change in Young's modulus (ΔE) over time.

The results are shown in FIG. 14. As shown in FIG. 14, thiol-ene crosslinking is permanent and activated under strain. FIG. 14(A) shows Young's modulus (E) over time of strained gels (solid markers) compared to gels without strain (open circles, no PEGDA and spontaneous). [T], [D], and [Cat] denote the concentrations of thiols, diene (in PEGDA), and DMPP catalyst, respectively. The concentration ratios of thiols to diene and thiols to catalyst were varied, as shown in FIG. 14(A). Higher catalyst loading resulted in faster thiol-ene crosslinking rate. However, in the presence of higher PEGDA concentration (i.e., [T]:[D]=2:2), intra-chain thiol-ene crosslinks were dominant relative to inter-chain crosslinks, resulting in smaller increase in stiffness compared to lower PEGDA concentration ([T]:[D]=2:1). FIG. 14(B) shows that, without stain, the change in Young's modulus (ΔE) over time of the same sets of gels as described in FIG. 14(A).

Figure 15:
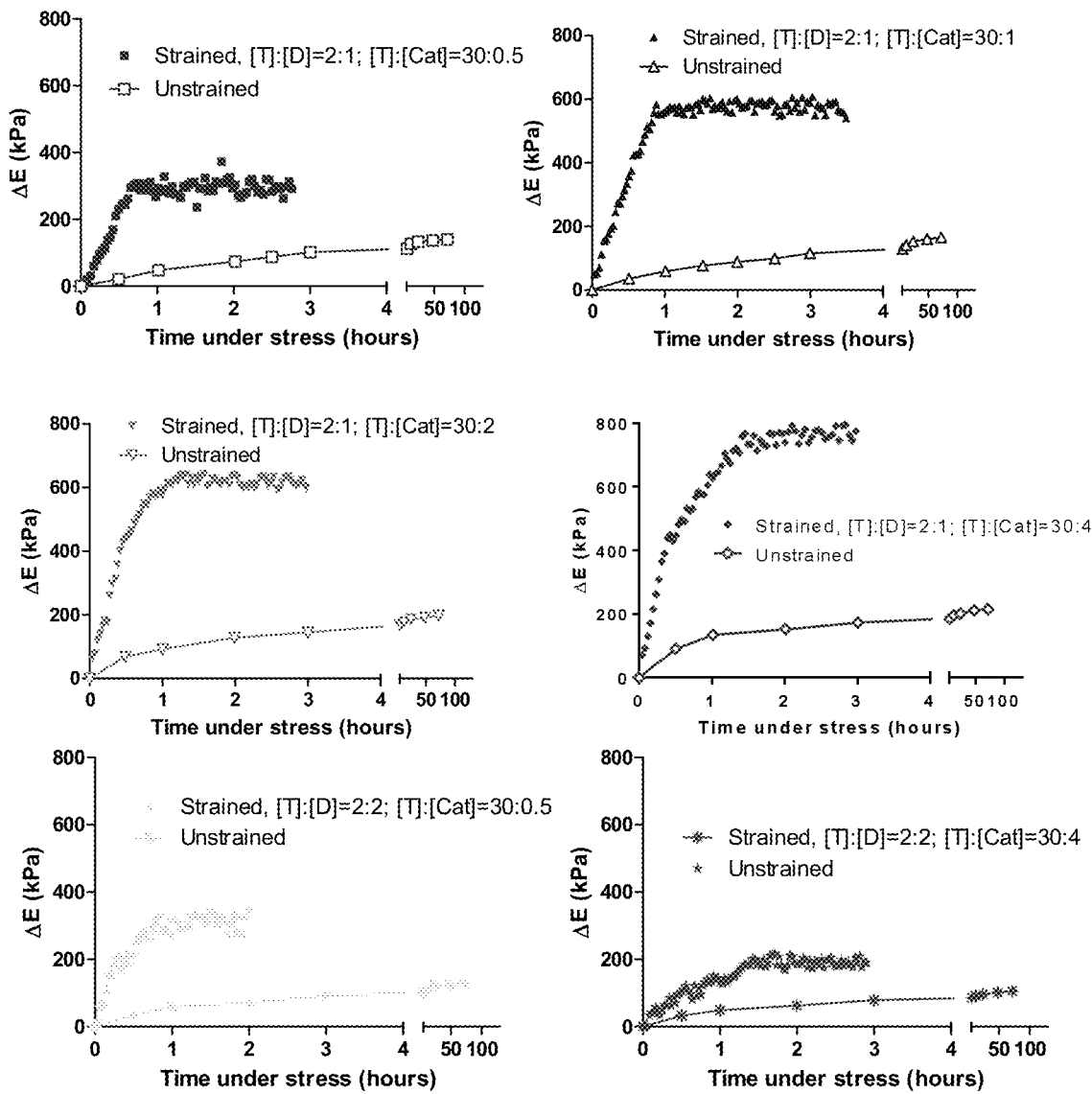
FIG. 15 shows the change in Young's modulus over time for strained gels compared to unstrained gels.

As shown in FIG. 15, without strain, diene groups prefer to crosslink to each other within short period of time. Gels at varying PEGDA and DMPP concentrations were strained under cyclic deformation. The change in Young's modulus was measured and compared to that of the unstrained gels. In all conditions, strained gels showed greater increase in stiffness and a faster crosslinking rate. Within a short time frame (i.e., less than 1 hour), strained gels of lower PEGDA concentration crosslinked at the fastest rate (i.e., greatest slope). Higher PEGDA concentration showed slower inter-chain crosslinking rate, indicating that there were more intrachain crosslinks formed.

Figure 16:
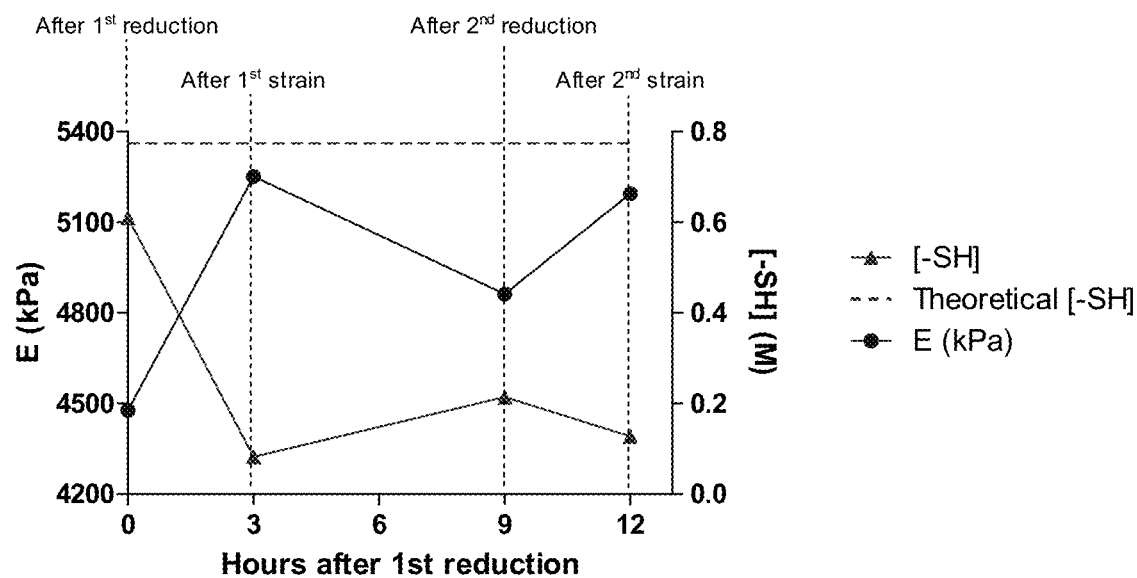
FIG. 16 shows the Young's modulus and thiol concentration in a gel sample after the first reduction, the first strain, the second reduction, and the second strain.

Ellman's test was used to show that at least some thiols formed permanent crosslinked with the "ene" groups of the PEGDA, resulting in a reduced free thiol content after the thiol-ene reaction. Exemplary results are shown in FIG. 16. Gels of [T]:[D]=2:1, [T]:[Cat]=30:4 were used. Gels were first reduced and strained for 3 hours under cyclic deformation, followed by a second reduction (6 hours) and strained again for 3 hours. Young's modulus (circles) and thiol concentration (triangles) were measured after each reduction and at the end of each strain period. The dashed red line represents the theoretical thiol concentration in the gel. As seen in FIG. 16, at least some thiols formed permanent crosslinks with diene groups, resulting in lower thiol content after second reduction. Young's modulus and thiol concentration were seen to be correlated. After the first reduction, most disulfides were cleaved to form thiols, which were available to react with PEGDA during the first strain period, resulting in lowest thiol concentration yet greatest stiffness. After a second reduction, disulfide bonds (both inter- or intra-chain) were reduced to free thiols, but thiol-ene bonds formed after the first deformation were not reduced. As a result, a small increase in thiol concentration and a relatively small decrease in stiffness were observed. After the second deformation, those remaining free thiols crosslink with each other to form inter-chain disulfides, resulting in a decrease in thiol concentration and increase in stiffness. Thus, thiol-ene is permanent and irreversible, i.e., reduction using sodium borohydride does not cleave these bonds. This feature can be useful to systems that require irreversible crosslinks.

Amine-Acetoacetoxy Crosslinking

In addition to the thiol-based systems above, alternative crosslinking chemistries were also explored, for example, based on an amine crosslinking reaction which was observed to be accelerated under stain. In the following example, a copolymer of HEMA and 2-(methacryloyloxy)ethyl acetoacetate (AAEM) and a copolymer of HEMA and 2-aminoethyl methacrylate hydrochloride (AEMA) were used. The molar ratio of each monomer in each mixture was varied from 1:99 to 20:80, with the total monomer concentration fixed at 2M. Table 3 shows exemplary polymer mixtures. DMSO was used as the solvent.

TABLE 3

| Monomer Ratio | | Monomer Volume | | Solvent Volume |
|---|---|---|---|---|
| AAEM (M) | HEMA (M) | AAEM (uL) | HEMA (uL) | DMSO (uL) |
| 1 | 99 | 3.82 | 240 | 756 |
| 1.75 | 98.25 | 6.68 | 238 | 755 |
| 2.5 | 97.5 | 9.55 | 237 | 754 |
| 5 | 95 | 19.1 | 230 | 750 |
| 10 | 90 | 38.2 | 218 | 743 |
| 20 | 80 | 76.4 | 194 | 730 |

The two polymers (i.e., one containing AAEM and one containing AEMA) were mixed at an equimolar ratio of the reactive groups. A time sweep test was performed for 24 hours using a parallel plate rheometer AR 2000 (1 mm gap, fixed at constant shear rate of 1 Hertz) with varying shear strain (1, 10 or 20%). The storage modulus (G'), loss modulus (G") and viscosity (q) were measured over time.

Figure 17:
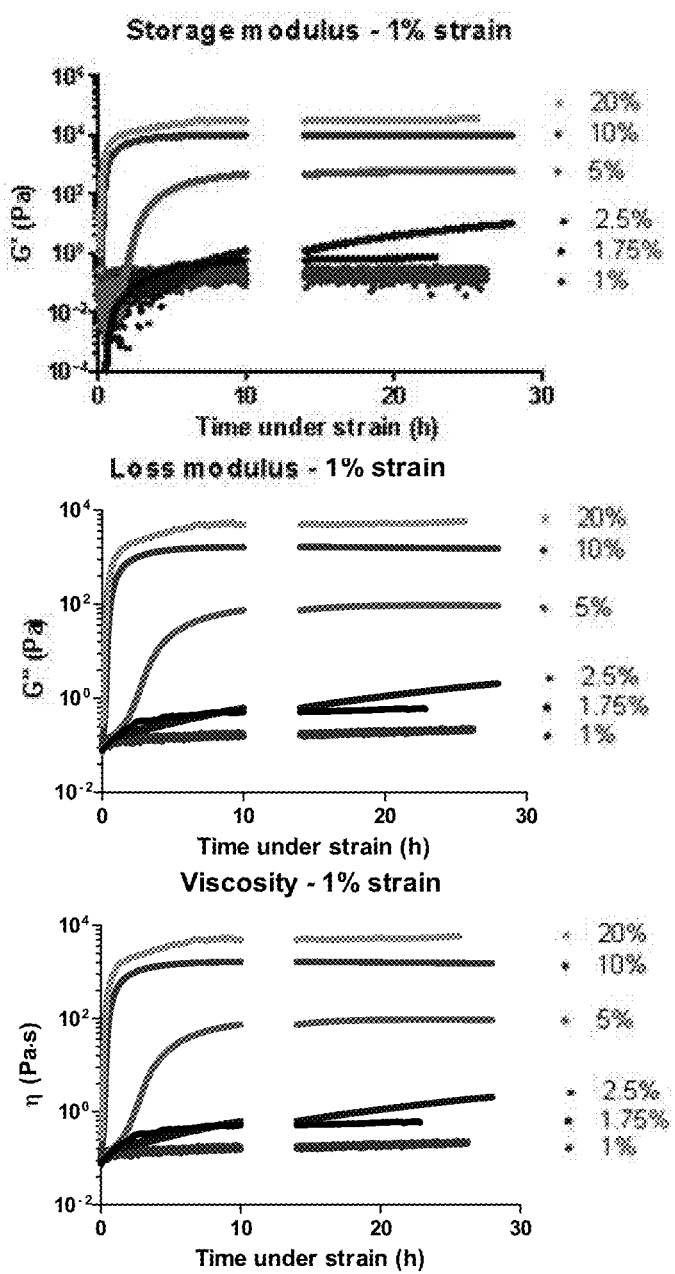
FIG. 17 shows the storage modulus, loss modulus, and viscosity at 1% strain.
Figure 18:
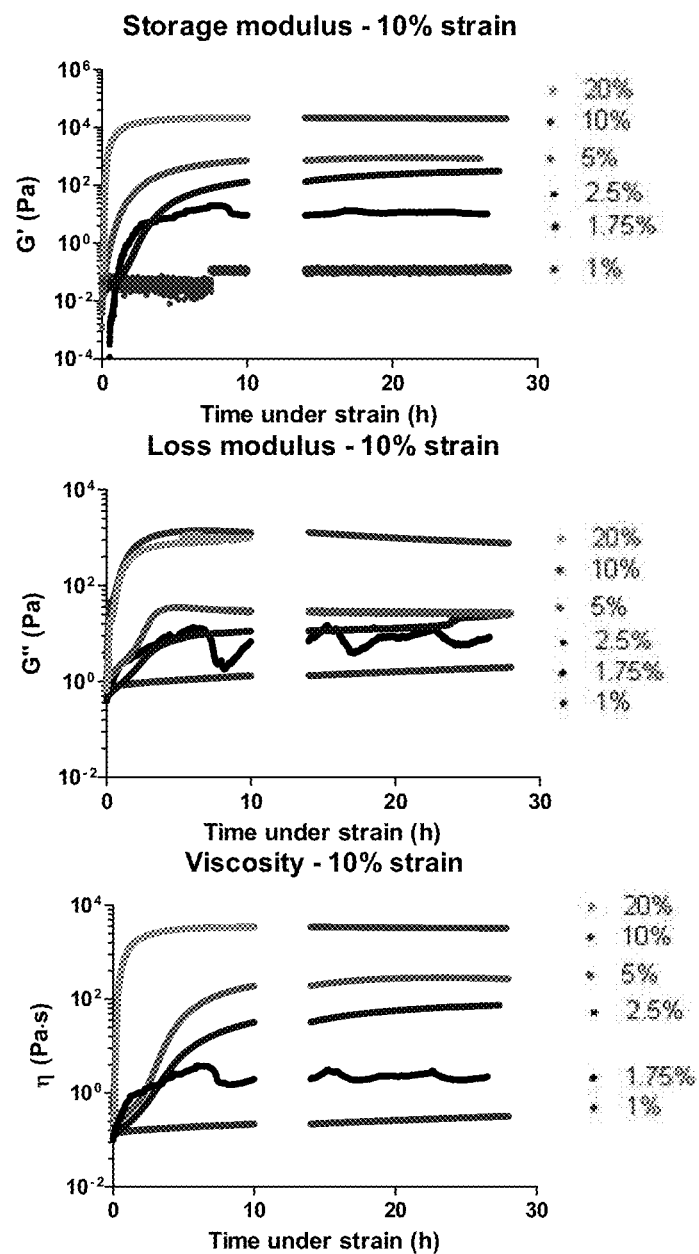
FIG. 18 shows the storage modulus, loss modulus, and viscosity at 10% strain.
Figure 19:
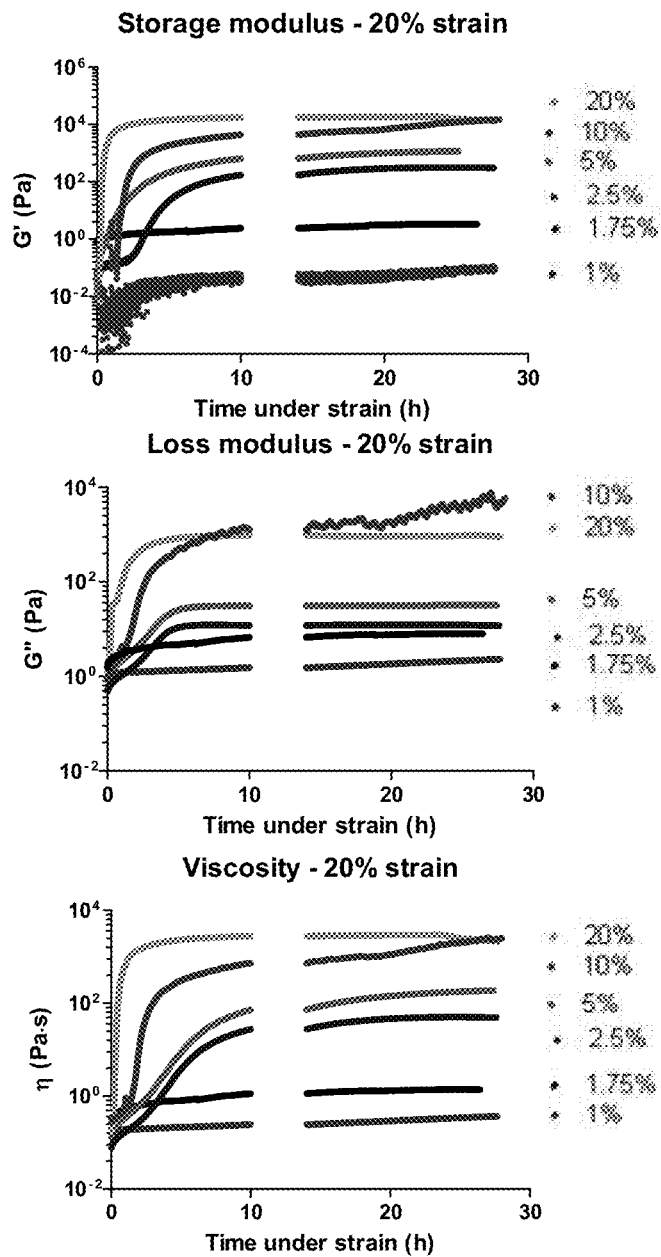
FIG. 19 shows the storage modulus, loss modulus, and viscosity at 20% strain.

As can be seen from FIG. 17-19, deformation induces inter-chain crosslinks between reactive moieties to form a crosslinked material (e.g., a pressure sensitive adhesive). FIG. 17 shows results from the time sweep test run at a shear strain of 1%. FIG. 18 shows results from the time sweep test run at a shear strain of 10%. FIG. 19 shows results from the time sweep test run at a shear strain of 20%. (A) in each of FIG. 17-19 show the storage modulus (G'), (B) in each of FIG. 17-19 show the loss modulus (G"), and (C) in each of FIG. 17-19 show the viscosity, each as a function of time.

Figure 20:
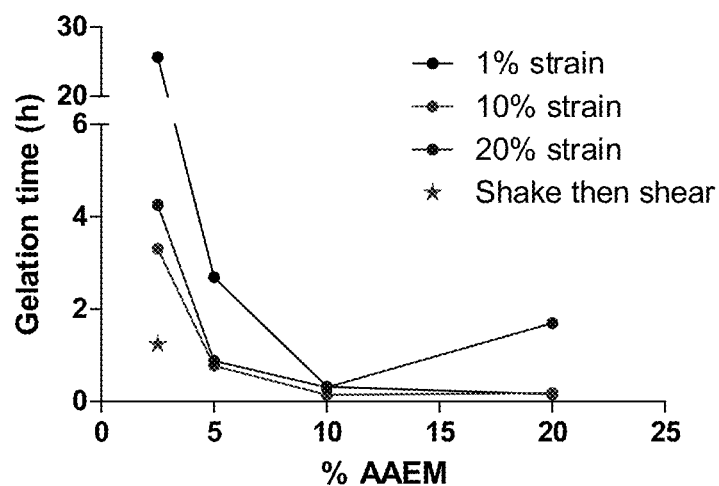
FIG. 20 shows time to gelation at varying strain rates.

FIG. 20 shows that the gelation point for the AAEM-AEMA gels occurs at a shorter time for higher reactive group concentrations.

"Shielding effects" were also explored for these polymer systems, whereby "less sticky" (i.e., less crosslinked) materials could be prepared. "Unshielded polymers" are those prepared according to the above procedure using AEMA, HEMA and AAEM. "Shielded polymers" were prepared using a similar procedure but HEMA was replaced with PEGMEMA having a molecular weight of 500 grams per mole. For example, For example, 5/95 AAEM/PEGMEMA and AEMA/PEGMEMA polymers were prepared using DMSO as solvent. The polymers were again mixed at equimolar ratios of reactive groups, and a time sweep was performed as 10% strain and 1 Hertz, and G', G", and η were measured. The results are shown in FIG. 21.

Figure 21:
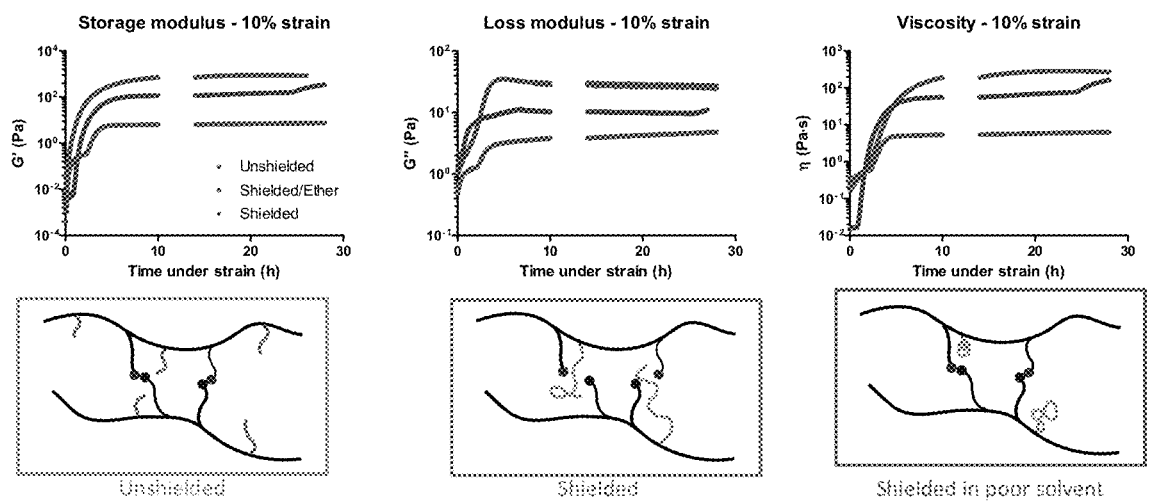
FIG. 21 shows the storage modulus, loss modulus, and viscosity at 10% strain for unshielded polymers (top curve), shielded polymers (bottom curve), and shielded polymers in a poor solvent (middle curve).

As can be seen in FIG. 21, the top curves of each plot correspond to the unshielded polymer mixture in DMSO, the middle curve corresponds to the shielded polymer mixture in a solvent consisting of a 1:1: mixture of DMSO and ether, and the bottom curve corresponds to the shielded polymer in DMSO. Schematics at the bottom illustrate polymer network behavior for unshielded polymer (left), shielded polymer (middle), and shielded polymer in poor solvent (right).

Comparing just the top and bottom curves, it can be seen that a shielding effect suppresses crosslinking. The longer comonomer serves as blocking groups thus delaying reactive moieties from crosslinking under shear. By suppressing the crosslinking, the so called "working time" or "open time" of the system is improved. The ultimate degree of crosslinking can influence adhesive strength. Shielding effect is not associated with shear strain—not much difference in dynamic moduli (G' and G") and viscosity over time across 3 different strains.

Changing the solvent was observed to suppress the shielding effect, as also shown in FIG. 21. In this example, the shielding effect was suppressed when diisopropyl ether, which is immiscible with PEGMEMA, was added. Without wishing to be bound by theory, it is believed that the block groups (i.e., the PEGMEMA) are collapsed when the poor solvent is present, thus inhibiting their action as blocking groups.

The invention includes at least the following embodiments.

Embodiment 1: A crosslinkable polymer composition comprising a first polymer comprising repeating units of formula (I)

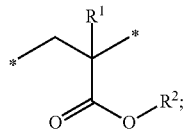

(I)

and repeating units derived from a monomer comprising an ethylenically unsaturated group and a crosslinkable functional group, wherein the crosslinkable functional group is capable of forming a covalent linkage with a second crosslinkable functional group of an adjacent repeating unit, a crosslinker, or both, when pressure is applied to the crosslinkable polymer composition, a time sufficient to cure the crosslinkable polymer composition has passed, or both; wherein in formula (I), $R^1$ is independently at each occurrence hydrogen or methyl; and $R^2$ is a $C_{4-12}$ alkyl group or a group of the formula

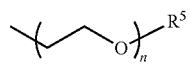

wherein $R^5$ is hydrogen or methyl and n is an integer from 1 to 230.

Embodiment 2: The crosslinkable polymer composition of embodiment 1, wherein the repeating units derived from a monomer comprising an ethylenically unsaturated group and a crosslinkable functional group are of formula (II)

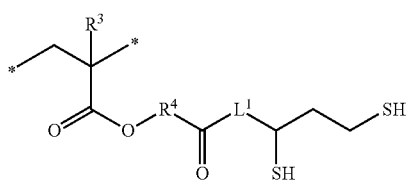

(II)

wherein $R^3$ is independently at each occurrence hydrogen or methyl; $R^4$ is a $C_{1-14}$ alkylene group or a group of the formula

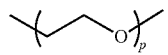

wherein p is an integer from 1 to 230; and $L^1$ is a $C_{1-12}$ alkylene group.

Embodiment 3: The crosslinkable polymer composition of embodiment 1, wherein the repeating units derived from a monomer comprising an ethylenically unsaturated group and a crosslinkable functional group are of formula (III)

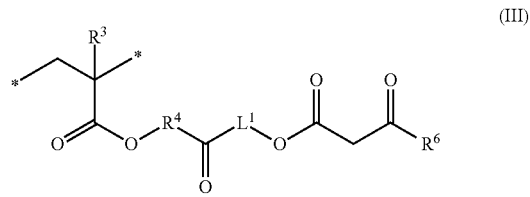

(III)

wherein $R^3$ is independently at each occurrence hydrogen or methyl; $R^4$ is a $C_{1-14}$ alkylene group or a group of the formula

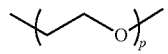

wherein p is an integer from 1 to 230; $L^1$ is a $C_{1-12}$ alkylene group; and $R^6$ is a $C_{1-6}$ alkyl group, preferably a methyl group.

Embodiment 4: The crosslinkable polymer composition of embodiment 1, wherein the repeating units derived from a monomer comprising an ethylenically unsaturated group and a crosslinkable functional group are of formula (IV)

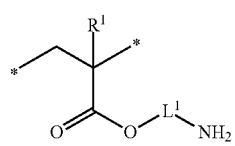

(IV)

wherein $R^3$ is independently at each occurrence hydrogen or methyl; and $L^1$ is a $C_{1-12}$ alkylene group.

Embodiment 5: The crosslinkable polymer composition of one or more of embodiments 1 to 4, wherein $R^1$ is hydrogen.

Embodiment 6: The crosslinkable polymer composition of any one or more of embodiments 2 to 5, wherein $R^3$ is methyl.

Embodiment 7: The crosslinkable polymer composition of any one of embodiments 1 to 6, wherein $R^2$ is a group of the formula

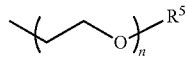

wherein $R^5$ is hydrogen and n is an integer from 1 to 10.

Embodiment 8: The crosslinkable polymer composition of any one of embodiments 2 to 7, wherein $R^4$ is a group of the formula

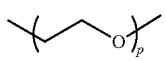

wherein p is 1.

Embodiment 9: The crosslinkable polymer composition of any one of embodiments 2 to 8, wherein $L^1$ is a butylene group.

Embodiment 10: The crosslinkable polymer composition of any one of embodiments 3 to 8, wherein $L^1$ is an ethylene group.

Embodiment 11: The crosslinkable polymer composition of any one of embodiments 1 to 10, comprising 60 to 99 mole percent repeating units according to formula (I); and 1 to 40 mole percent repeating units derived from a monomer comprising an ethylenically unsaturated group and a crosslinkable functional group; wherein mole percent of each component is based on the total moles of repeating units according to formula (I) repeating units derived from a monomer comprising an ethylenically unsaturated group and a crosslinkable functional group.

Embodiment 12: The crosslinkable polymer composition of any one of embodiments 1 to 11, further comprising repeating units derived from a multifunctional crosslinker comprising at least two polymerizable groups of formula (V)

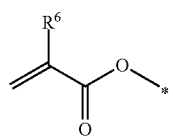

(V)

wherein $R^6$ is hydrogen or methyl.

Embodiment 13: The crosslinkable polymer composition of embodiment 12, wherein the multifunctional crosslinker comprises a difunctional poly(ethylene glycol) crosslinker of formula (VI)

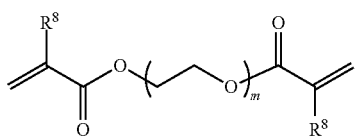

(VI)

wherein $R^8$ is hydrogen or methyl and m is an integer from 1 to 230.

Embodiment 14: The crosslinkable polymer composition of embodiment 12 or 13, wherein repeating units derived from the multifunctional crosslinker are present in an amount of less than 1 weight percent, based on the total weight of the crosslinkable polymer composition.

Embodiment 15: The crosslinkable polymer composition of any of embodiments 1 to 14, further comprising repeating units derived from an ethylenically unsaturated monomer in an amount effective to increase the glass transition temperature of the crosslinkable polymer composition.

Embodiment 16: The crosslinkable polymer composition of any of embodiments 1 to 15, wherein the crosslinkable polymer composition is a pressure sensitive adhesive composition.

Embodiment 17: The crosslinkable polymer composition of embodiment 1, comprising the first polymer comprising repeating units of formula (I) and repeating units derived from the monomer comprising an ethylenically unsaturated group and a crosslinkable functional group are of formula (III); and a second polymer comprising repeating units of formula (I) and repeating units derived from the monomer comprising an ethylenically unsaturated group and a crosslinkable functional group are of formula (IV); wherein the crosslinkable functional groups of formula (III) and (IV) form a covalent linkage when pressure is applied to the crosslinkable polymer composition, a time sufficient to cure the crosslinkable polymer composition has passed, or both.

Embodiment 18: A method for the manufacture of a crosslinkable polymer composition according to any one of embodiments 1 to 17, the method comprising copolymerizing a first monomer of formula (V)

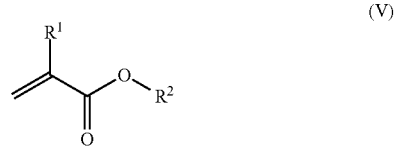

(V)

and a monomer comprising an ethylenically unsaturated group and a crosslinkable functional group, wherein the crosslinkable functional group is capable of forming a covalent linkage with a second crosslinkable functional group of an adjacent repeating unit, a crosslinker, or both, when pressure is applied to the crosslinkable polymer composition, a time sufficient to cure the crosslinkable polymer composition has passed, or both.

Embodiment 19: A method for the manufacture of a crosslinkable polymer composition according to any one of embodiments 2 to 13, the method comprising: copolymerizing a first monomer of formula (VII) and a second monomer of formula (VIII)

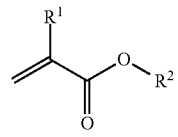

(VII)

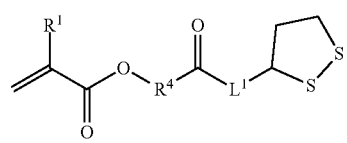

(VIII)

wherein $R^1$ and $R^3$ are independently at each occurrence hydrogen or methyl; $R^2$ is a $C_{4-12}$ alkyl group or a group of the formula

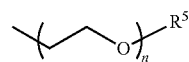

wherein $R^5$ is hydrogen or methyl and n is an integer from 1 to 230; $R^4$ is a $C_{1-14}$ alkylene group or a group of the formula

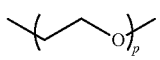

wherein p is an integer from 1 to 230; and $L^1$ is a $C_{1-12}$ alkylene group to provide a disulfide-containing polymer; and reducing the disulfide-containing polymer to provide the crosslinkable polymer composition.

Embodiment 20: The method of embodiment 19, wherein reducing the disulfide-containing polymer comprises contacting the disulfide-containing polymer with a reducing agent, preferably comprising sodium borohydride.

Embodiment 21: A pressure sensitive adhesive comprising a crosslinked polymer composition derived from the crosslinkable polymer composition of any one of embodiments 1 to 18.

Embodiment 22: The pressure sensitive adhesive of embodiment 21, wherein the crosslinked polymer composition is derived from a crosslinkable polymer composition comprising repeating units according to formula (I) and (II), and the crosslinked polymer composition comprises a plurality of disulfide crosslinks formed between repeating units of formula (II).

Embodiment 23: The pressure sensitive adhesive of embodiment 21 or 22, wherein the crosslinked polymer composition is derived from a crosslinkable polymer composition comprising repeating units according to formula (I) and (II), and the crosslinked polymer composition is crosslinked by reaction with a compound comprising at least two alkenyl groups capable of reacting with the crosslinkable polymer composition to form thioether bonds.

Embodiment 24: The pressure sensitive adhesive of embodiment 21, wherein the crosslinked polymer composition is derived from a crosslinkable polymer composition comprising the first polymer comprising repeating units according to formula (I) and (III), and a second polymer comprising repeating units according to formula (I) and (IV).

Embodiment 25: The pressure sensitive adhesive of any one of embodiments 21 to 24, wherein the pressure sensitive adhesive is a pressure sensitive adhesive tape comprising a substrate and an adhesive layer comprising the crosslinked polymer composition disposed on at least a portion of a surface of the substrate.

Embodiment 26: A method of making a pressure sensitive adhesive, the method comprising: contacting a substrate with the crosslinkable polymer composition of any one of embodiments 1 to 18; and curing the crosslinkable polymer composition to provide the pressure sensitive adhesive.

Embodiment 27: The method of embodiment 26, wherein curing the crosslinkable polymer composition comprises applying pressure to the pressure sensitive adhesive, waiting for a time sufficient to cure the crosslinkable polymer composition, or both.

Embodiment 28: A coating comprising a crosslinked polymer composition derived from the crosslinkable polymer composition of any one of embodiments 1 to 18.

Embodiment 29: The coating of embodiment 28, wherein the crosslinked polymer composition is derived from a crosslinkable polymer composition comprising repeating units according to formula (I) and (II), and the crosslinked polymer composition comprises a plurality of disulfide crosslinks formed between repeating units of formula (II).

Embodiment 30: The coating of embodiment 28 or 29, wherein the crosslinked polymer composition is derived from a crosslinkable polymer composition comprising repeating units according to formula (I) and (II), and the crosslinked polymer composition is crosslinked by reaction with a compound comprising at least two alkenyl groups capable of reacting with the crosslinkable polymer composition to form thioether bonds.

Embodiment 31: The coating of embodiment 28, wherein the crosslinked polymer composition is derived from a crosslinkable polymer composition comprising the first polymer comprising repeating units according to formula (I) and (III), and a second polymer comprising repeating units according to formula (I) and (IV).

Embodiment 32: The coating of any one of embodiments 28 to 31, wherein the coating is disposed on at least a portion of a surface of a substrate.

Embodiment 33: A method of making a coating, the method comprising: contacting a substrate with the crosslinkable polymer composition of any one of embodiments 1 to 18; and curing the crosslinkable polymer composition to provide the coating.

Embodiment 34: The method of embodiment 33, wherein curing the crosslinkable polymer composition comprises applying pressure to the coating, waiting for a time sufficient to cure the crosslinkable polymer composition, or both.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

All cited patents, patent applications, and other references are incorporated herein by reference in their entirety, including priority U.S. Provisional Application No. 62/537,130, filed Jul. 26, 2017. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

As used herein, the term "alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene (—$CH_2$—) or propylene (—$(CH_2)_3$—)). "Aryl" means a monovalent, monocyclic or polycyclic aromatic group (e.g., phenyl or naphthyl). Unless otherwise indicated, each of the foregoing groups can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. When the substituent is oxo (i.e., =O), then two hydrogens on the atom are replaced. Combinations of substituents and/or variables are permissible provided that the substitutions do not significantly adversely affect synthesis or use of the compound. Groups that can be present on a substituted position include (—NO$_2$), cyano (—CN), hydroxy (—OH), halogen, thiol (—SH), thiocyano (—SCN), C$_{2-6}$ alkanoyl (e.g., acyl (H$_3$CC(=O)—); carboxamido; C$_{1-6}$ or C$_{1-3}$ alkyl, cycloalkyl, alkenyl, and alkynyl (including groups having at least one unsaturated linkages and from 2 to 8, or 2 to 6 carbon atoms); C$_{1-6}$ or C$_{1-3}$ alkoxy; C$_{6-10}$ aryloxy such as phenoxy; C$_{1-6}$ alkylthio; C$_{1-6}$ or C$_{1-3}$ alkylsulfmyl; C$_{1-6}$ or C$_{1-3}$ alkylsulfonyl; aminodi(C$_{1-6}$ or C$_{1-3}$)alkyl; C$_{6-12}$ aryl having at least one aromatic rings (e.g., phenyl, biphenyl, naphthyl, or the like, each ring either substituted or unsubstituted aromatic); C$_{7-19}$ arylalkyl having 1 to 3 separate or fused rings and from 6 to 18 ring carbon atoms; or arylalkoxy having 1 1 to 3 separate or fused rings and from 6 to 18 ring carbon atoms.

The invention claimed is:

1. A crosslinkable polymer composition comprising
a first polymer comprising repeating units of formula (I)

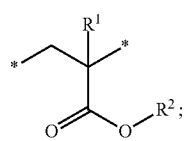

(I)

and
repeating units derived from a monomer comprising an ethylenically unsaturated group and a crosslinkable functional group, wherein the crosslinkable functional group is capable of forming a covalent linkage with a second crosslinkable functional group of an adjacent repeating unit, a crosslinker, or both, when pressure is applied to the crosslinkable polymer composition, a time sufficient to cure the crosslinkable polymer composition has passed, or both;
wherein the repeating units derived from a monomer comprising an ethylenically unsaturated group and a crosslinkable function group are of formula (II)

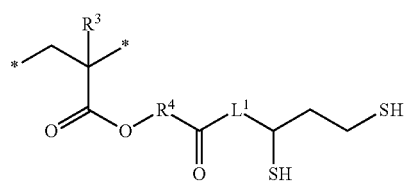

(II)

wherein in formula (I),
R$^1$ is independently at each occurrence hydrogen or methyl; and
R$^2$ is independently at each occurrence a C$_{4-12}$ alkyl group or a group of the formula

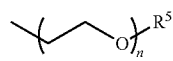

wherein R$^5$ is hydrogen or methyl and n is an integer from 1 to 230, and
wherein in formula (II),
R$^3$ is independently at each occurrence hydrogen or methyl;
R$^4$ is a C$_{1-14}$ alkylene group or a group of the formula

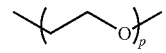

wherein p is an integar from 1 to 230; and
L$^1$ is a C$_{1-12}$ alkylene group.

2. The crosslinkable polymer composition of claim 1, wherein
R$^1$ is hydrogen and R$^3$ is methyl;
R$^2$ is a group of the formula

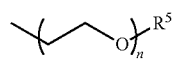

wherein R$^5$ is hydrogen and n is an integer from 1 to 10; and
R$^4$ is a group of the formula

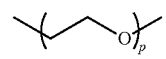

wherein p is 1.

3. The crosslinkable polymer composition of claim 1 wherein L$^1$ is a butylene group.

4. The crosslinkable polymer composition of claim 1, comprising
60 to 99 mole percent repeating units according to formula (I); and
1 to 40 mole percent repeating units derived from a monomer comprising an ethylenically unsaturated group and a crosslinkable functional group;
wherein mole percent of each component is based on the total moles of repeating units according to formula (I) repeating units derived from a monomer comprising an ethylenically unsaturated group and a crosslinkable functional group.

5. The crosslinkable polymer composition of claim 1, further comprising repeating units derived from a multifunctional crosslinker comprising at least two polymerizable groups of formula (V)

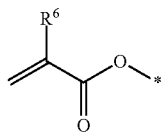

(V)

wherein R$^6$ is hydrogen or methyl.

6. The crosslinkable polymer composition of claim 5, wherein the multifunctional crosslinker comprises a difunctional poly(ethylene glycol) crosslinker of formula (V)

(VI)

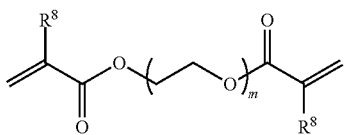

wherein R⁸ is hydrogen or methyl and m is an integer from 1 to 230.

7. The crosslinkable polymer composition of claim 5, wherein repeating units derived from the multifunctional crosslinker are present in an amount of less than 1 weight percent, based on the total weight of the crosslinkable polymer composition.

8. The crosslinkable polymer composition of claim 1, further comprising repeating units derived from an ethylenically unsaturated monomer in an amount effective to increase the glass transition temperature of the crosslinkable polymer composition.

9. A method for the manufacture of a crosslinkable polymer composition according to claim 1, the method comprising:

copolymerizing a first monomer of formula (VII) and a second monomer of formula (VIII)

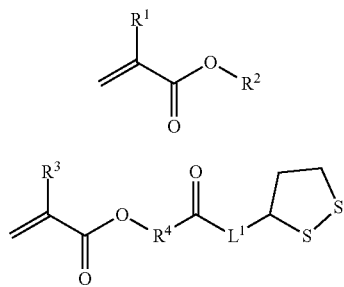

wherein
R¹ and R³ are independently at each occurrence hydrogen or methyl;
R² is a C₄₋₁₂ alkyl group or a group of the formula

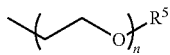

wherein R⁵ is hydrogen or methyl and n is an integer from 1 to 230;
R⁴ is a C₁₋₁₄ alkylene group or a group of the formula

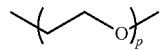

wherein p is an integer from 1 to 230; and
L¹ is a C₁₋₁₂ alkylene group to provide a disulfide-containing polymer; and reducing the disulfide-containing polymer to provide the crosslinkable polymer composition.

10. The method of claim 9, wherein reducing the disulfide-containing polymer comprises contacting the disulfide-containing polymer with a reducing agent.

11. A pressure sensitive adhesive or a coating comprising a crosslinked polymer composition derived from the crosslinkable polymer composition of claim 1.

12. The pressure sensitive adhesive or coating of claim 11, wherein the crosslinked polymer composition is derived from a crosslinkable polymer composition comprising repeating units according to formula (I) and (II), and the crosslinked polymer composition comprises a plurality of disulfide crosslinks formed between repeating units of formula (II).

13. The pressure sensitive adhesive or coating of claim 11, wherein the crosslinked polymer composition is derived from a crosslinkable polymer composition comprising repeating units according to formula (I) and (II), and the crosslinked polymer composition is crosslinked by reaction with a compound comprising at least two alkenyl groups capable of reacting with the crosslinkable polymer composition to form thioether bonds.

14. A method of making a pressure sensitive adhesive or a coating, the method comprising:

contacting a substrate with the crosslinkable polymer composition of claim 1; and curing the crosslinkable polymer composition to provide the pressure sensitive adhesive or the coating;

wherein curing the crosslinkable polymer composition comprises applying pressure to the pressure sensitive adhesive, waiting for a time sufficient to cure the crosslinkable polymer composition, or both.

* * * * *